US012632721B2

(12) United States Patent
Zhang et al.

(10) Patent No.: US 12,632,721 B2
(45) Date of Patent: May 19, 2026

(54) ACTOR ENSEMBLE FOR CONTINUOUS CONTROL

(71) Applicant: Huawei Technologies Co., Ltd., Shenzhen (CN)

(72) Inventors: Shangtong Zhang, Oxford (GB); Hengshuai Yao, Markham (CA); Hao Chen, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 1199 days.

(21) Appl. No.: 17/167,842

(22) Filed: Feb. 4, 2021

(65) Prior Publication Data

US 2021/0232922 A1    Jul. 29, 2021

Related U.S. Application Data

(63) Continuation of application No. PCT/CN2019/090092, filed on Jun. 5, 2019.

(Continued)

(51) Int. Cl.
*G06N 3/08*        (2023.01)
*G06F 18/211*     (2023.01)
(Continued)

(52) U.S. Cl.
CPC ............. *G06N 3/08* (2013.01); *G06F 18/211* (2023.01); *G06F 18/214* (2023.01); *G06N 3/045* (2023.01); *G06N 20/20* (2019.01)

(58) Field of Classification Search
CPC .......... G06N 3/08; G06N 20/20; G06N 3/045; G06F 18/211; G06F 18/214
See application file for complete search history.

(56) References Cited

U.S. PATENT DOCUMENTS 11,436,529 B1 *  9/2022  Londeree .............. G06F 16/353
11,593,878 B2 *  2/2023  Kim .......................... G06N 3/08
(Continued)

FOREIGN PATENT DOCUMENTS

CN       107065881 A1    8/2017
WO     2017139507 A1    8/2017
WO     2018083532 A1    5/2018

OTHER PUBLICATIONS

Andrew et al.("Reinforcement Learning in Artificial Intelligence", Advances in Psychology, vol. 121, 1997, pp. 358-386) (Year: 1997).*

(Continued)

*Primary Examiner* — Jennifer N Welch
*Assistant Examiner* — Quoc Ly Phu Phung

(57) ABSTRACT

A method of training a reinforcement learning agent to output actions from a continuous action space, comprising: providing an actor ensemble that includes a plurality of actor neural networks that each output a respective action from the continuous action space in response to an observed state of an environment; providing a critic neural network that approximates a state-action value function indicating an impact of an action on the environment based on a reward from the environment and the observed state of the environment; training the actor ensemble and the critic neural network to maximize a state-action value from the state-action value function over successive time steps by, in each time step: selecting from the respective actions output by the plurality of actor neural networks the action that will provide a best state-action value from the state-action value function; applying the selected action to the environment; based on an observed state of the environment of in response to the selected action, determine a gradient ascent for the plurality of actor neural networks for updating the parameters of the plurality of actor neural networks and determine a gradient (Continued)

descent for the critic neural network for updating the parameters of the critic neural network.

21 Claims, 8 Drawing Sheets

Related U.S. Application Data

(60) Provisional application No. 62/736,914, filed on Sep. 26, 2018.

(51) Int. Cl.
| | |
|---|---|
| *G06F 18/214* | (2023.01) |
| *G06N 3/045* | (2023.01) |
| *G06N 20/20* | (2019.01) |

(56) References Cited

U.S. PATENT DOCUMENTS

| | | | | |
|---|---|---|---|---|
| 11,625,604 | B2 * | 4/2023 | Budden | G06N 20/00 |
| | | | | 706/25 |
| 2013/0346614 | A1 * | 12/2013 | Baughman | G06F 9/5083 |
| | | | | 709/226 |
| 2016/0260024 | A1 * | 9/2016 | Campos | G06Q 10/10 |
| 2017/0024643 | A1 * | 1/2017 | Lillicrap | G06N 3/045 |
| 2017/0213126 | A1 | 7/2017 | Hammond | |
| 2018/0012137 | A1 * | 1/2018 | Wright | G05B 13/0265 |
| 2019/0025917 | A1 * | 1/2019 | Francis | A61B 5/369 |
| 2020/0293883 | A1 * | 9/2020 | Budden | G06N 3/045 |
| 2021/0012227 | A1 * | 1/2021 | Fang | H04L 41/5067 |

OTHER PUBLICATIONS

DQN—Mnih et al.; "Human-level control through deep reinforcement learning"; Nature—vol. 518; Feb. 26, 2015.
DDPG—Lillicrap et al.; "Continuous control with deep reinforcement learning"; Published as a conference paper at ICLR 2016; arXiv preprint arXiv:1509.02971.
Farquhar et al.; "TreeQN:TreeQN and ATreeC: Differentiable Tree-Structured Models for Deep Reinforcement Learning"; Published as a conference paper at ICLR 2018.
Bacon, P.L.; Harb, J.; and Precup, D; "The option-critic architecture"; In Proceedings of the 31st AAAI Conference on Artificial Intelligence; 2017.
Barth-Maron, G.; Hoffman, M. W.; Budden, D.; Dabney, W.; Horgan, D.; Muldal, A.; Heess, N.; and Lillicrap, T. 2018; Distributed distributional deterministic policy gradients; arXiv preprint arXiv:1804.08617.
Browne, C. B.; Powley, E.; Whitehouse, D.; Lucas, S. M.; Cowling, P. I.; Rohlfshagen, P.; Tavener, S.; Perez, D.; Samothrakis, S.; and Colton, S.; "A survey of Monte Carlo tree search methods"; IEEE Transactions on Computational Intelligence and AI in Games, vol. 4, No. 1, Mar. 2012.
Coulom, R.; "Efficient selectivity and backup operators in Monte Carlo tree search"; In Proceedings of the International Conference on Computers and Games; May 2006, Turin, Italy.
Degris, T.; White, M.; and Sutton, R. S.; "Off-policy actor-critic"; arXiv preprint arXiv:1205.4839; 2012.
Gu, S.; Lillicrap, T.; Sutskever, I.; and Levine, S.; "Continuous deep Q-learning with model-based acceleration"; In Proceedings of the 33rd International Conference on Machine Learning; 2016.
Hans, A., and Udluft, S; "Ensembles of neural networks for robust reinforcement learning"; In Proceedings of the 9th International Conference on Machine Learning and Applications; 2010.
Huang, Z.; Zhou, S.; Zhuang, B.; and Zhou, X.; "Learning to run with actor-critic ensemble"; arXiv preprint arXiv:1712.08987; 2017.
Klissarov, M.; Bacon, P.-L.; Harb, J.; and Precup, D.; "Learnings options end-to-end for continuous action tasks"; arXivpreprint arXiv:1712.00004; 31st conference of Neural Information Processing Systems; 2017.
Knuth, D. E., and Moore, R. W.; "An analysis of alpha-beta pruning"; Artificial Intelligence; vol. 6; Issue 4; 1975.
Lin, L.-J; "Self-improving reactive agents based on reinforcement learning, planning and teaching"; Machine Learning, 8, 293-321; 1992.
Mansley, C. R.; Weinstein, A.; and Littman, M. L.; "Sample-based planning for continuous action markov decision processes"; Proceedings of the 21st International Conference on Automated Planning and Scheduling, ICAPS 2011, Freiburg, Germany Jun. 2011.
Nair, V. and Hinton, G.E.; "Rectified Linear Units Improve Restricted Boltzmann Machines"; Proceedings of the 27th International Conference on Machine Learning, Haifa, Jun. 21, 2010, 807-814.
Nitti, D.; Belle, V.; and De Raedt, L.; "Planning in Discrete and Continuous Markov Decision Processes by Probabilistic Programming"; In Proceedings of the 17th Joint European Conference on Machine Learning and Knowledge Discovery in Databases; Sep. 2015.
Oh, J.; Singh, S.; and Lee, H.; "Value prediction network"; In Advances in Neural Information Processing Systems; 2017.
Osband, I.; Blundell, C.; Pritzel, A.; and Van Roy, B.; "Deep exploration via bootstrapped DQN"; In Advances in Neural Information Processing Systems; Jul. 2016.
Silver, D.; Lever, G.; Heess, N.; Degris, T.; Wierstra, D.; and Riedmiller, M.; "Deterministic policy gradient algorithms"; In Proceedings of the 31st International Conference on Machine Learning; 2014.
Silver, D.; Huang, A.; Maddison, C. J.; Guez, A.; Sifre, L.; Van Den Driessche, G.; Schrittwieser, J.; Antonoglou, I.; Panneershelvam, V.; Lanctot, M.; et al.; "Mastering the game of go with deep neural networks and tree search"; Nature; vol. 529; Jan. 28, 2016.
Sturtevant, N.; "An analysis of UCT in multi-player games"; In Proceedings of the International Conference on Computers and Games; Dec. 2008.
Sutton, R. S.; McAllester, D. A.; Singh, S. P.; and Mansour, Y.; "Policy gradient methods for reinforcement learning with function approximation"; In Advances in Neural Information Processing Systems; 2000.
Sutton, R. S.; Precup, D.; and Singh, S.; "Between MDPs and semi-MDPS: a framework for temporal abstraction in reinforcement learning". Artificial Intelligence; 112 (1999); 181-121.
Sutton, R. S.; "Integrated architectures for learning, planning, and reacting based on approximating dynamic programming"; In Proceedings of the 7th International Conference on Machine Learning; pp. 216-224; 1990.
Tassa, Y. et al.; "DeepMind control suite"; arXiv preprint arXiv:1801.00690; Jan. 2018.
Tesauro, G.; "Temporal difference learning and TD-gammon"; Communications of the ACM, vol. 38, No. 3, pp. 58-68; 1995.
Uhlenbeck, G.E. and Omstein, L.S.; "On the Theory of Brownian Motion"; Physical Review, 36, 823-841. https://doi.org/10.1103/PhysRev.36.823; Sep. 1, 1930.
Watkins, C. J., and Dayan, P.; "Q-learning"; Machine Learning, 8, 279-292; 1992.
Weber, T; Racaniere, S.; Reichert, D. P.; Buesing, L.; Guez, A.; Rezende, D. J.; Badia, A. P.; Vinyals, O.; Heess, N.; Li, Y; et al.; "Imagination-augmented agents for deep reinforcement learning"; arXiv preprint arXiv:1707.06203; 2017.
Wiering, M. A., and Van Hasselt, H.; "Ensemble algorithms in reinforcement learning"; IEEE Transactions on Systems, Man, and Cybernetics, Part B (Cybernetics); 2008.
Yao, H.; Bhatnagar, S.; Diao, D.; Sutton, R. S.; and Szepesvari, C. 2009. Multi-step dyna planning for policy evaluation and control. In Advances in Neural Information Processing Systems.
Yee, T; Lisy, V.; and Bowling, M. H.; "Monte Carlo tree search in continuous action spaces with execution uncertainty"; In Proceedings of the 25th International Joint Conference on Artificial Intelligence; 2016.

* cited by examiner

ACTOR ENSEMBLE FOR CONTINUOUS CONTROL

CROSS-REFERENCE TO RELATED APPLICATIONS

The present application is a continuation of PCT Application No. PCT/CN2019/090092, filed Jun. 5, 2019, which claims priority to provisional U.S. Patent Application No. 62/736,914, filed Sep. 26, 2018, the contents of these documents being incorporated herein by reference.

FIELD

The present application relates generally to software agents of artificial intelligence (AI) systems for use in continuous control applications and, more specifically, to a method of using reinforcement learning to train a software agent of an AI system for use in continuous control applications.

BACKGROUND

Reinforcement Learning (RL), in the context of artificial intelligence (AI), is a type of machine learning that is concerned with how software agents carry out actions in an environment to maximize a cumulative rewards. RL has been historically implemented using dynamic programming that trains trainable functions using a system of rewards. In some recent AI systems employing reinforcement learning, neural networks have been used to learn the trainable functions. Neural networks have achieved great success as function approximators in various challenging domains.

SUMMARY

In accordance with an aspect of the present disclosure, a method for training a reinforcement learning agent to output continuous actions from a continuous action space is provided. The method includes (a) at each actor neural network among a plurality of actor neural networks, receiving a current state of the environment for a time step and outputting a continuous action for the current state based on a deterministic policy approximated by the actor neural network, thereby outputting a plurality of continuous actions; (b) at a critic neural network, receiving the current state of the environment and the continuous action output by each respective actor neural network and outputting a state-action value for the state and the respective continuous action based on a state-action value function approximated by the critic neural network, thereby outputting a plurality of state-action values, each state-action value, among the plurality of state-action values, associated with a continuous action among the plurality of continuous actions; (c) selecting, at an action selector, from among the plurality of continuous actions, a continuous action, wherein the selected continuous action is associated with a state-action value that is maximum among the plurality of state-action values; (d) causing an AI system comprising the RL agent to carry out the selected continuous action in the environment; (e) generating a tuple comprising the state of the environment, the selected continuous action received from the action selector, a reward provided by the environment, a next state of the environment received from the environment; (f) storing the tuple in a reply buffer comprising a set of tuples; (g) sampling the reply buffer to obtain a batch of tuples from the set of tuples; (h) determining, based on the batch of tuples, a respective update for parameters of each respective actor neural network of the plurality of actor neural networks; and (i) providing, to the each actor neural network among the plurality of actor neural networks, the respective update. In other aspects of the present application, a processing unit is provided including a processor configured for carrying out this method and a computer readable medium is provided for adapting the processor in the processing unit to carry out this method.

In another aspect of the present disclosure, the respective update for parameters of each respective actor neural network of the plurality of actor neural networks is determined using gradient ascent.

In another aspect of the present disclosure, the method includes (j) determining, based on the batch of tuples, an update for parameters of the critic neural network, and providing to the critic neural network, the update for parameters for the critic neural network.

In another aspect of the present disclosure, the update for parameters of the critic neural network is determined using gradient descent.

In another aspect of the present disclosure, steps (a)-(j) are repeated for a predetermined number of time steps.

In another aspect of the present disclosure, prior to step (a), the parameters of each respective actor neural network are initialized, wherein the parameters of each respective actor neural network of the plurality of actor neural networks are initialized differently.

In another aspect of the present disclosure, the method includes, at the critic neural network, performing a look-ahead tree search and backup process to predict the state-action value for the state and the respective continuous action.

In another aspect of the present disclosure, the critic neural network is representative of a value prediction model.

In another aspect of the present disclosure, the critic neural network is a representative of a transition model.

In accordance with another aspect of the present disclosure, a processing unit I comprising a memory storing instructions, and a processor configured, by the instructions, to train a reinforcement learning (RL) agent of an AI system is provided. The processor is configured to train the RL agent by: (a) at each actor neural network among a plurality of actor neural networks, receiving a current state of the environment for a time step and outputting a continuous action for the current state based on a deterministic policy approximated by the actor neural network, thereby generating a plurality of continuous actions; (b) at a critic neural network, receiving the current state of the environment and the continuous action output by each respective actor neural network and outputting a state-action value for the state and the respective continuous action based on a state-action value function approximated by the critic neural network, thereby outputting a plurality of state-action values, each state-action value, among the plurality of state-action values, associated with a continuous action among the plurality of continuous actions; (c) selecting, at an action selector, from among the plurality of continuous actions, a continuous action, wherein the selected continuous action is associated with a state-action value that is maximum among the plurality of state-action values; (d) causing an AI system comprising the RL agent to carry out the selected continuous action in the environment; (e) generate a tuple comprising the state of the environment, the selected continuous action received from the action selector, a reward provided by the environment, a next state of the environment received from the environment; (f) storing the tuple in a reply buffer comprising a set of tuples; (g) sampling the reply buffer to obtain a batch of tuples from the set of tuples; (h) determining, based on the batch of tuples, a respective update for parameters of each respective actor neural network of the plurality of actor neural networks; and (i) providing, to the each actor neural network among the plurality of actor neural networks, the respective update.

BRIEF DESCRIPTION OF THE DRAWINGS

The present disclosure is made with reference to the accompanying drawings, in which embodiments are shown. However, many different embodiments may be used, and thus the description should not be construed as limited to the embodiments set forth herein. Like numbers refer to like elements throughout, and prime notation may be used to indicate similar elements, operations or steps in alternative embodiments. Reference will now be made, by way of example, to the accompanying drawings which show example implementations; and in which.

Similar reference numerals may have been used in different figures to denote similar components.

DETAILED DESCRIPTION

Figure 1:
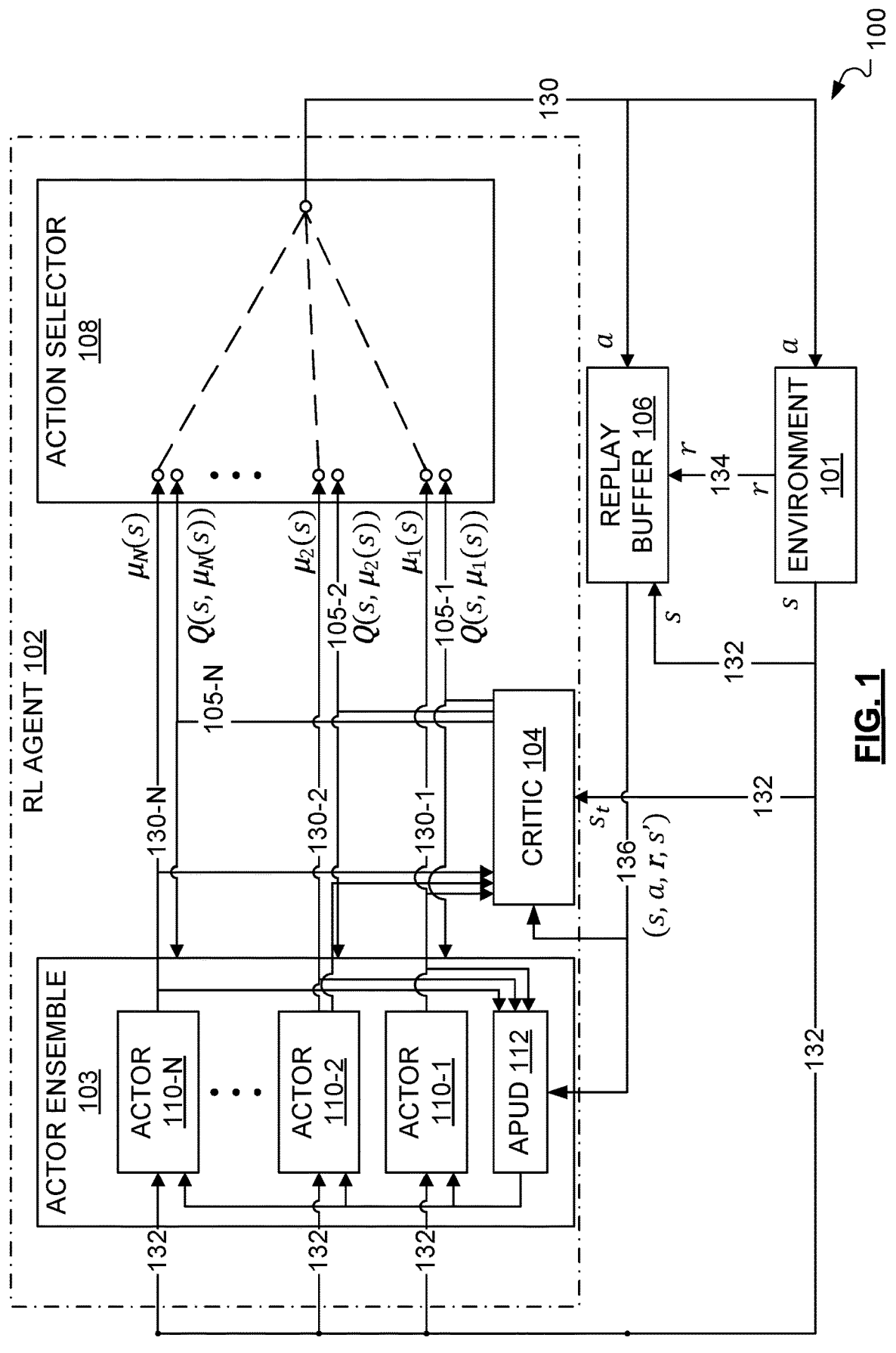
FIG. 1 schematically illustrates a reinforcement learning system including a reinforcement learning agent and an environment and, in accordance with an aspect of the present application, the reinforcement learning agent includes an actor ensemble and a critic.

In actor-critic RL methods, a deterministic policy may be approximated by a parameterized actor neural network and the actor neural network is trained, using a gradient ascent algorithm, to maximize a state-action value function. The state-action value function may be approximated by a parameterized critic neural network. The critic neural network is trained, using a gradient descent algorithm, to minimize a temporal difference error.

"Gradient ascent" is a name for a type of algorithm that may be used to find values of parameters of a function which maximize the function. Similarly, "gradient descent" is a name for a type of algorithm that may be used to find values of parameters of a function which minimize the function.

It is known that, in operation, an implementation of a gradient ascent algorithm for a particular function can become trapped in one of multiple local maxima of a function during the search for the global maximum for the particular function. Additionally, when the function for which a global maximum is being sought is the state-action value function approximated by a parameterized critic neural network, it can be difficult to accurately estimate or predict the output of the state-action value function (e.g., a state-action value) in the context of a continuous action space, that is, when the action belongs in a continuous action space rather than a discrete action space.

Accordingly, aspects of the present application include a system and method of training a reinforcement learning agent, which includes a plurality of actor neural networks, each of which receives a state and outputs an action for the state in accordance with a deterministic policy. The system and method selects the action given the state which maximizes a state-action value function. Aspects of the present application include a system and method for training the RL agent in a manner that avoids the actor neural networks getting trapped by one of many local maxima of the state-action value function and a manner that involves accurately determining the state-action value function in the context of a continuous action space.

Aspects of the present application relate to training a reinforcement learning agent to output actions from a continuous action space. The RL agent, once trained, may be implemented in the different kinds of AI systems used for continuous control applications, such as advanced driver-assistance systems (ADASs) or autonomous self-driving vehicles.

Other aspects and features of the present disclosure will become apparent to those of ordinary skill in the art upon review of the following description of specific implementations of the disclosure in conjunction with the accompanying figures.

Continuous control Artificial Intelligence (AI) systems can require a high dimensionality of actions. When reinforcement learning (RL) is used for training a software agent of an AI system for continuous control applications, a deterministic policy (i.e., a policy that maps a state to an action deterministically) can be useful. As noted hereinbefore, a deterministic policy may be approximated by a parameterized actor neural network, is usually trained using a gradient ascent algorithm to maximize a state-value function. The state-action value function may be approximated by a parameterized by a critic neural network. However, an implementation of the gradient ascent algorithm can be easily trapped by one of many local maxima during a search for a global maximum. This issue may be referenced as "local maxima trapping." Additionally, it can be difficult to accurately determine the state-action value function of the critic.

In overview, to mitigate local maxima trapping, aspects of the present application relate to methods training an RL based software agent (hereinafter RL agent) that determines an action using an actor ensemble that includes multiple actors. The use of an actor ensemble that includes multiple actors stands in contrast to the known determining of an action using a single actor.

According to aspects of the present application, the multiple actor neural networks are trained in parallel. The parameters of each actor neural network may be initialized differently. The different initialization of the parameters enables at least some of the actors to cover different areas of the state-action value function. As a result, each distinct actor neural network within the ensemble can find a distinct local maximum. The impact, on the environment, of the best action of all of the continuous actions proposed by all the actor neural networks in the ensemble can then be considered. In this manner, a likelihood of finding a global maximum of a state-action value function using a multiple-actor RL system may be found to be higher than a likelihood of finding the global maximum of the state-action value function using a single-actor RL system. Furthermore, in aspects of the present application, a look-ahead tree search is performed using a value prediction model. In at least some examples, the use of the value prediction model may improve an accuracy of a prediction of the output (e.g., the value) of the state-action value function.

In aspects of the present application, an RL agent determines, based on an observed state and from within a continuous action space, a particular continuous action, thereby generating a determined action. The observed state is a dataset that represents the state of the environment that the RL agent can observe. The RL agent then applies the determined action in the environment. In aspects of the present application, the environment is a simulated environment and the RL agent is implemented as one or more computer programs interacting with the simulated environment. For example, the simulated environment may be a video game and the RL agent may be a simulated user playing the video game. As another example, the simulated environment may be a motion simulation environment, e.g., a driving simulation environment or a flight simulation environment, and the RL agent may be associated with a simulated vehicle navigating through the motion simulation environment. In these implementations, the actions may be values in a continuous action space of possible control inputs to control the simulated user or simulated vehicle. In the case of a vehicle, the continuous action space of possible control inputs may, for example, include a plurality of steering angles.

In some other aspects of the present application, the environment may be a real-world environment. The RL agent may control a physical AI system interacting with the real-world environment. For example, the RL agent may control a robot interacting with the environment to accomplish a specific task. As another example, the RL agent may control an autonomous or semi-autonomous vehicle navigating through the environment. In these implementations, each action may be a value in a continuous action space of possible control inputs to control the robot or the autonomous vehicle. In the case of an autonomous vehicle, the continuous action space of possible control inputs may, for example, include a plurality of steering angles.

FIG. 1 illustrates an example RL system 100 that includes an RL agent 102 and an environment 101. The RL agent 102, in accordance with aspects of the present application, is a computer program executed on one or more computers. In accordance with aspects of the present application, different components or functions of the RL agent 102 may be implemented using different virtual machines on the same computer. In example simulation embodiments, the environment 101 may also be implemented as a plurality of computer programs on one or more computers in one or more locations. In real-world embodiments, the environment 101 can be represented through real-time measurements made by one or more sensing systems, including: a camera system; a lidar system; a radar system; an inertial sensing system; and a radio frequency receiver system, among other sensing systems.

The RL agent 102 includes an actor ensemble 103, a critic 104 and an action selection function 108. The actor ensemble 103 includes a plurality of parameterized actor neural networks: a first parameterized actor neural network 110-1 approximating a deterministic policy $\mu\_1$; a second parameterized actor neural network 110-2 approximating a deterministic policy $\mu\_2$; . . . ; and an N^th parameterized actor neural network, 110-N approximating a deterministic policy $\mu\_N$. Collectively or individually, the parameterized actor neural networks may be reference using reference numeral 110. Notably, the N^th actor parameterized neural network 110-N is not intended to represent the fourteenth parameterized actor neural network; rather, the ordinal N is representative of an indeterminate plurality. The actor ensemble 103 also includes an actor parameter update determiner ("APUD") 112. The actor parameter update determiner 112 is connected to receive the output of each actor neural network 110 and the output of the critic 104. The actor parameter update determiner 112 is also connected to distribute appropriate updates for the parameters of each actor neural network 110 as described in further detail below.

The critic 104 includes a parametrized critic neural network 320 (FIG. 3) approximating a state-action value function, $Q(s,a)$ As mentioned above, the RL agent 102 is a computer program (e.g., software), and that the actor ensemble 103, the action selector 108 and the critic 104 are all sub-modules of the RL agent 102 software.

As will be explained in detail hereinafter, the parameterized actor neural networks 110 (referred to hereinafter actor neural networks 110) may be trained, in parallel, to improve the approximation of the deterministic policy by each actor neural network 110, while the critic 104 evaluates the approximation of the deterministic policies by the actor neural networks 110. During training, the actor neural networks 110 of the actor ensemble 103 and the critic neural network 320 of the critic 104 may be seen to improve simultaneously, by bootstrapping on each other.

In addition to the critic 104, the RL system 100 may include training components such as a replay buffer 106. The system 100 may also include other training components such as a target critic (not shown) and a target actor (not shown). The replay buffer 106 may, for example, be used to store experience tuples that include a first state 132 of the environment 101 (e.g., an observed state, $s_t$, for a first time step, t), a continuous action 130, $a_t$, selected by the RL agent 102 in response to the observed state 132, $s_t$, a training reward 134, $r_{t+1}$, received by the critic 104 and a next state 132 of the environment, i.e., the state, $s_{t+1}$, that the environment 101 transitioned into after the element (not shown) of the environment 101 performed the continuous action 130, $a_t$, provided by the RL agent 102.

The target critic (not shown) and the target actor (not shown) may be used to determine, based on a batch of experience tuples sampled from the replay buffer 106, an update for the parameters for each of the actor neural networks 110 and an update for the parameters for the critic neural network 320, 620 of the critic 104. The updates for the parameters of each of the actor neural networks 110 are determined by the ADUP 112 of the actor ensemble 103. The updates for the parameters of the critic neural network 320 are determined by the critic parameter update determiner 318 of the critic 104.

Figure 2:
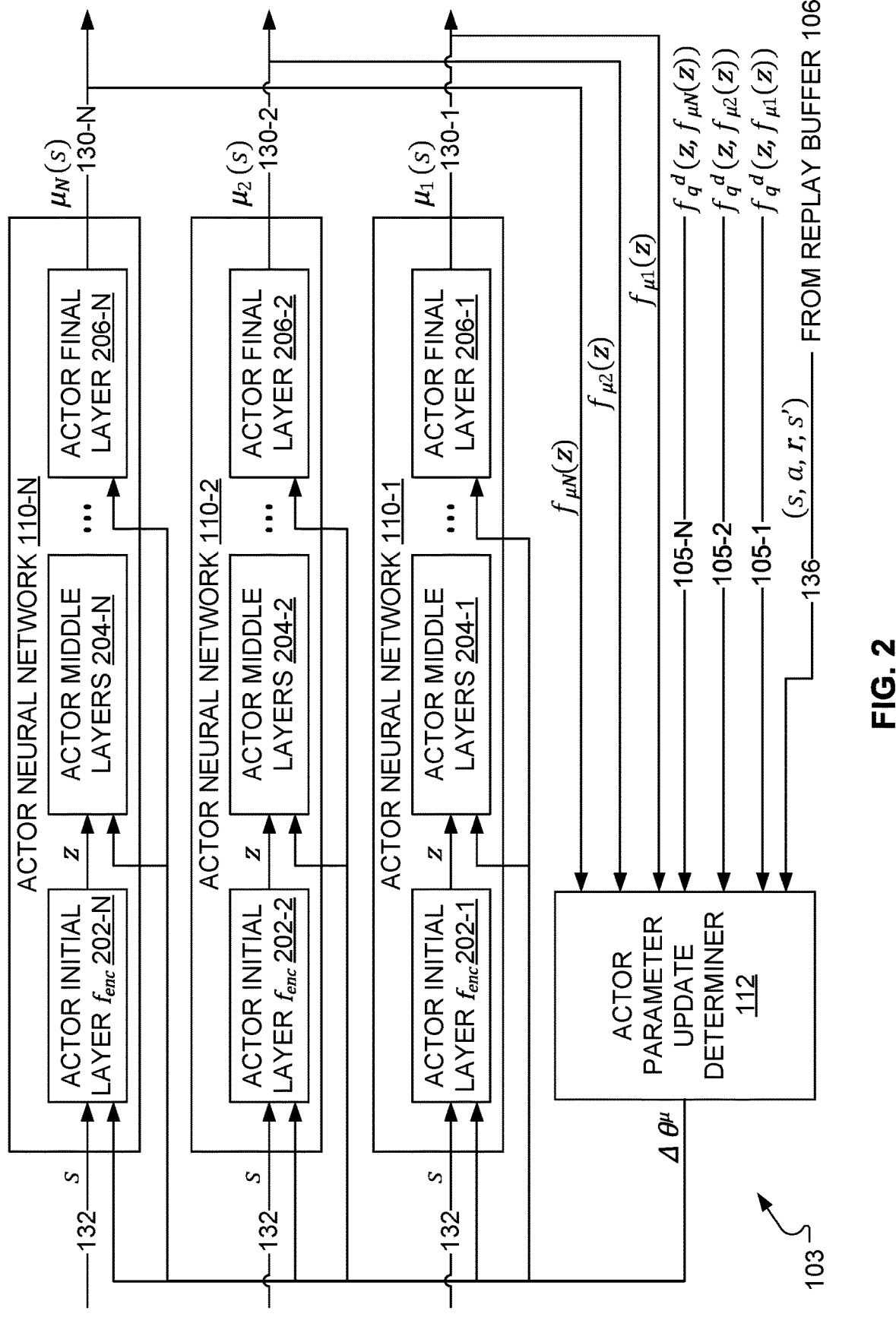
FIG. 2 schematically illustrates an example of the actor ensemble of FIG. 1, in accordance with aspects of the present application.

FIG. 2 schematically illustrates an example of the actor ensemble 103 of FIG. 1, in accordance with aspects of the present application. The actor ensemble 103 illustrated in FIG. 2 has, in common with the actor ensemble 103 illustrated in FIG. 1, the plurality of actor neural networks 110 and the actor parameter update determiner 112. Each actor neural network 110 in the plurality of actor neural network is illustrated, in FIG. 2, as being implemented as a deep neural network comprising multiple layers. The first actor neural network 110-1 includes an actor initial layer 202-1, actor middle layers 204-1 and an actor final layer 206-1. The second actor neural network 110-2 includes an actor initial layer 202-2, actor middle layers 204-2 and an actor final layer 206-2. The $N^{th}$ actor neural network 110-N includes an actor initial layer 202-N, actor middle layers 204-N and an actor final layer 206-N.

The actor parameter update determiner 112 is illustrated as receiving output 130-1, 130-2, 130-N from each actor final layer 206-1, 206-2, 206-N. The actor parameter update determiner 112 is also illustrated as receiving output 105-1, 105-2, 105-N from the critic 104 (e.g., the critic neural network 320 of the critic 104). The actor parameter update determiner 112 is also illustrated as providing updates for the parameters of the first actor neural network 110-1 to the layers 202-1, 204-1, 206-1 of the first actor neural network 110-1. The actor parameter update determiner 112 is further illustrated as providing updates for the parameters of the second actor neural network 110-2 to the layers 202-2, 204-2, 206-2 of the second actor neural network 110-2. The actor parameter update determiner 112 is still further illustrated as providing updates for the parameters of the $N^{th}$ actor neural network 110-1 to the layers 202-N, 204-N, 206-N of the $N^{th}$ actor neural network 110-1.

Figure 3:
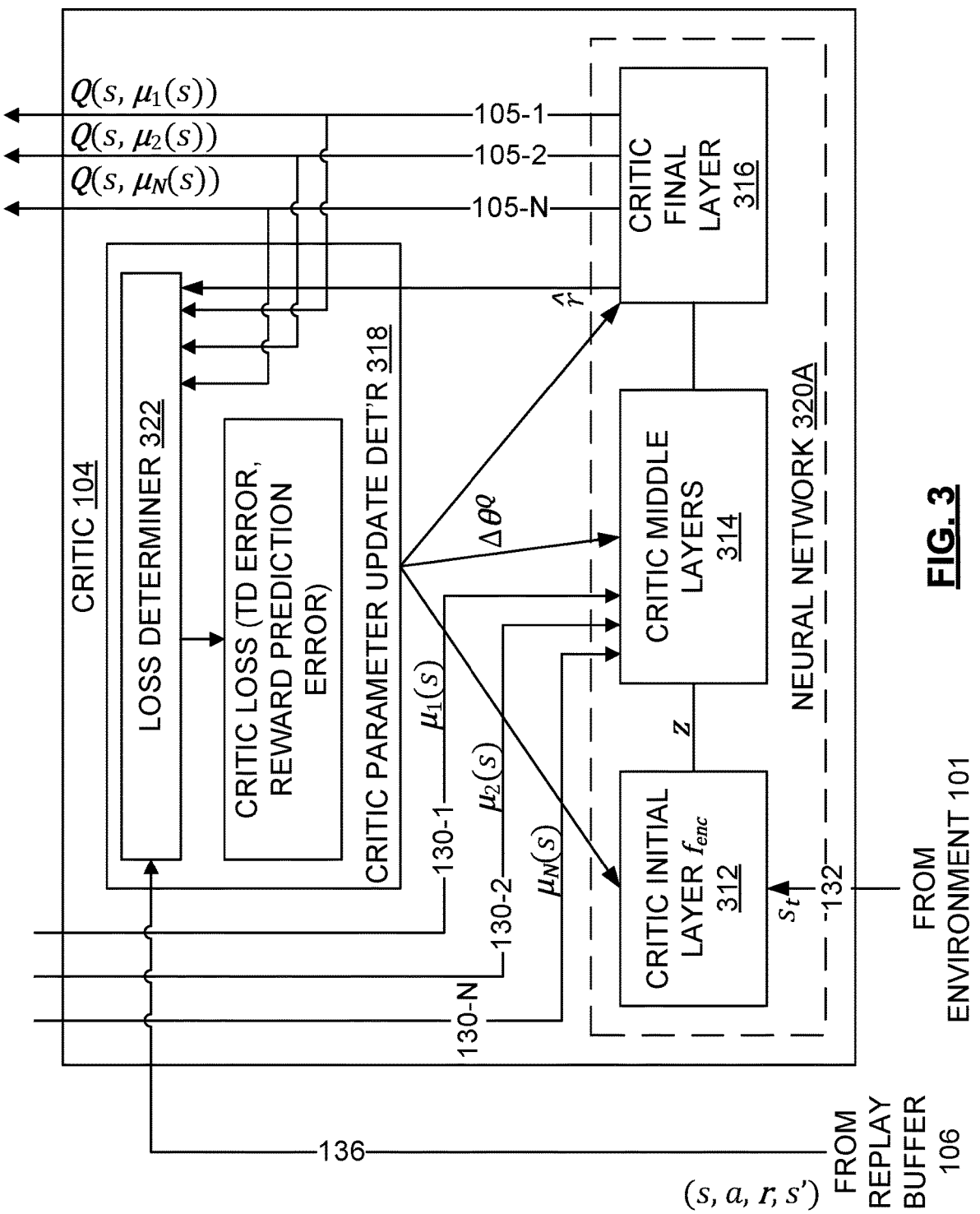
FIG. 3 schematically illustrates an example of the critic of FIG. 1 that includes a neural network represented by a value prediction model in accordance with aspects of the present application.

FIG. 3 schematically illustrates an example of the critic 104 of FIG. 1 in accordance with aspects of the present application. The critic 104 is illustrated in FIG. 3 includes a critic parameter update determiner 318, the parameterized critic neural network 320. The critic neural network 320 represents a value prediction model. The critic neural network 320 may be a deep neural network that includes a critic initial layer 312, a critic middle layers 314 and a critic final layer 316. The critic parameter update determiner 318 provides the update for the parameters of the critic neural network 320. The critic layers 312, 314, 316 of the critic neural network 320 receive updates for the parameters of the critic neural network 320 from the critic parameter update determiner 318. The critic parameter update determiner 318 calculates a loss value for the critic neural network 320 using a loss determiner 322, which assists in determining updates for the parameters of the critic neural network 320.

The RL system 100 is used to train the RL agent 102. During training, at each time step, t, the RL agent 102 receives a state, $s_t$, of the environment 101 and selects a continuous action, $a_t$, that is to be performed by AI system in the environment 101. The environment 101 then gives a reward, $r_{t+1}$, and indicates, to the RL agent 102, that the environment 101 has transitioned to a next state, $s_{t+1}$. AS noted hereinbefore, the RL agent 102 includes N actor neural networks 110 that are trained in parallel. In a basic example, each actor neural network 110 is trained using a gradient ascent algorithm, such that, when a generic one of the actor neural networks 110, which may be associated with the reference number 110-i, and which approximates the deterministic policy, up, is provided with a state, s, the generic one of the actor neural networks 110-i outputs the continuous action, $a=\mu_i(s)$.

FIG. 1 illustrates that a plurality of state-action values 105-1, 105-2, . . . , 105-N ($Q(s_t,\mu_i(s_t))$ may be provided, by the critic neural network 320 of the critic 104, to the action selection function 108 and to the ADUP 112 of the actor ensemble 103.

A Greek letter, $\theta^{\mu_i}$, may be used to represent a set of parameters of each respective actor neural network 110-i

(referred to hereinafter as actor parameters). The actor gradient, $\nabla_\theta Q(s_t,\mu_i(s_t))$ at a time step, t, for a generic actor neural network 110-i, is:

$$\nabla_{\theta^\mu}Q(s_t,\mu_i(s_t))=\nabla_a Q(s,a)|_{s=s_t,a=\mu_i(s_t)}\nabla_{\theta\theta^\mu}\mu_i(s)|_{s=s_t}$$

for all i∈ {1, . . . , N}.

At each time step, t, the actor ensemble 103 outputs N continuous actions 130-1, 130-2, . . . , 130-N ($a=\mu_i(s_t)$). The critic 104 receives the continuous action output by each respective actor neural network 110 of the actor ensemble 103 and outputs a state-action value for the state-action function, $Q(s_t,a)$, and the continuous action associated with the state-action value to the action selector 108. The action selection function 108 is configured to select one of the N continuous actions ($a=\mu_i(s_t)$) that maximizes the state-action value function, $Q(s_t,a)$, as follows:

$$a_t\doteq\text{argmax}_{a\in\{\mu_i(s_t)\}_{i=1,\ldots,N}}Q(s_t,a).$$

The action selection function 108 therefore selects the "best" continuous action, where the "best" continuous action is the one continuous action among the N continuous actions that maximizes the state-action value function (e.g. selects the continuous action associated with the maximum state-action value for the state-action function, $Q(s_t,a)$).

The set of actor parameters $\theta^{\mu_i}$ of each actor neural network 110 may be initialized independently, so that each distinct actor neural network 110 is likely to cover a distinct local maximum of the state-action value function, $Q(s_t,a)$. The act of selecting, at the action selection function 108, the maximum state-action value among the N state-action values associated with continuous actions output by the N actor neural networks 110 may be seen to increase a probability of finding a global maximum of the state-action value function.

In addition to finding a global maximum of the state-action value function, it is desirable to a temporal-difference (TD) error of the critic neural network 320.

In one example, the critic neural network 320 of the critic 104 is trained by taking one gradient descent algorithm step at each time, t, to minimize the TD error, which may be represented as:

$$\frac{1}{2}(r_{t+1}+\gamma\max_{i\in\{1,\ldots,N\}}Q(s_{t+1},\mu_i(s_{t+1}))-Q(s_t,a_t))^2.$$

Although the actor parameters $\theta^\mu$ of each actor neural network 110 are initialized differently and the actor neural networks 110 are trained in parallel, it may be considered that the actor neural networks 110 are not trained independently of each other. Rather, the actor neural networks 110 reinforce each other by influencing the updates to the actor parameters $\theta^\mu$ of other actor neural networks 110.

The example operation of the RL system 100 provided hereinbefore is a basic example. An estimation or prediction of the state-action values output by the critic neural network 320 that approximates the state-action value function, $Q(s,a)$ can be enhanced by using a look-ahead tree search method when the critic neural network 320 represents a value prediction model. The look-ahead tree search method employs latent states ($z_t$) of the original states ($s_t$). Latent states ($z_t$) are lower dimension, abstracted representations of the original states ($s_t$).

In an example embodiment, the deterministic policy approximated by each actor neural networks 110 and the state-value action function $Q(s,a)$ approximated by the critic neural network 320 may be composed of the following learnable functions:

(1) $f_{enc}$:$S \rightarrow \mathbb{R}^n$, where $f_{enc}$ is an encoding function that transforms a state, $s_t$, from state space, $S$, into an n-dimensional latent state, $z_t$, from latent state space, $\mathbb{R}^n$. The encoding function, $f_{enc}$, is parameterized by $\theta^{enc}$.

(2) $f_{rew}$:$\mathbb{R}^n \times \mathcal{A} \rightarrow \mathbb{R}$, where $f_{rew}$ is a reward prediction function that predicts an immediate reward, $r_t$, from a reward space, $\mathbb{R}$, given a latent state, $z_t$, and an action, $a_t$, from action space, $\mathcal{A}$. The reward prediction function, $f_{rew}$, is parameterized by $\theta^{rew}$ (3) $f_{trans}$:$\mathbb{R}^n \times \mathcal{A} \rightarrow \mathbb{R}^n$, where $f_{trans}$ is a transition function that predicts a next latent state, $z_{t+1}$, for a given latent state, $z_t$, and an action (denoted by $a_t$). The transition function, $f_{trans}$, is parameterized by $\theta^{trans}$.

(4) $f_q$:$\mathbb{R}^n \times \mathcal{A} \rightarrow \mathbb{R}$, where $f_q$ is a latent state-action value prediction function that returns a value based on a latent state, $z_t$, and a corresponding action, $a_t$. The latent state-action value prediction function, $f_q$, is parameterized by $\theta^q$.

(5) $f_{\mu_i}$: $\mathbb{R}^n \rightarrow \mathcal{A}$, where $f_{\mu_i}$ is an actor function that returns an action, $a_t$, for a given latent state, $z_t$. Each actor function, $f_{\mu_i}$, is parameterized by a respective $\theta^{\mu_i}$, for each $i \in \{1, \ldots, N\}$.

In example embodiments, each deterministic policy, $\mu_i(s_t)$, is represented as a respective actor function $f_{\mu_i}(z_t)$, where $z_t = f_{enc}(s_t)$. Thus a deterministic policy, $\mu_i(s_t)$, approximated by a respective actor neural network 110-$i$ at a time, t, can be represented by $f_{\mu_i}(z_t)$, that is $f_{\mu_i}(z_t) = \mu_i(s_t)$. In some examples, $f_{\mu_i}(z_{t|0})$ is used to represent $\mu_i(s_t)$, where $z_{t|0}$ represents a latent state at a given time step, t, denoted as $z_{t|0} = f_{enc}(s_t)$. Here $z_{t|l}(l=0,1,2)$ represents the predicted latent state after l steps from time step t in a look-ahead tree search, which will be discussed in greater detail hereinafter. In example embodiments, actor ensemble parameters for the actor ensemble 103 include the parameter, gene, of the encoding function, $f_{enc}$, as well as respective sets of parameters, $\{\theta^{\mu_1}, \ldots, \theta^{\mu_N}\}$, for each of the N actor neural networks 110. In general, the actor ensemble parameters may be represented by single symbol, $\theta^{\mu}$ (i.e., $\theta^{\mu} = \{\theta^{ene}, \theta^{\mu_1}, \ldots, \theta^{\mu_N}\}$).

The state-action value function, $Q(s_t, a_t)$, approximated by the critic neural network 320 of the critic 104 of the RL agent 102 may be represented as $f_q(z_{t|0}, a_{t|0})$, where $z_{t|0} = f_{enc}(s_t)$ and $a_{t|0} = a_t$. The neural network parameters for the critic neural network 320 of the critic 104 include the parameters in the set $\{\theta^{enc}, \theta^{rew}, \theta^{trans}, \theta^q\}$ for the functions $f_{enc}$, $f_{rew}$, $f_{trans}$ and $f_q$, respectively, denoted generically, hereinafter, as critic neural network parameters represented by single symbol, $0^Q$ (i.e., $\theta^Q = \{\theta^{ene}, \theta^{rew}, \theta^{trans}, \theta^q\}$). The critic neural network parameters $\theta^Q$, and the actor ensemble parameters, $\theta^{\mu}$, may be optimized as described hereinafter.

In example embodiments, the representative state-action value function, $f_q(z_{t|0}, a_{t|0})$, may be decomposed into the sum of a predicted immediate reward, $f_{rew}(z_{t|0}, a_{t|0})$, and the state-action value of a predicted next latent state, $z_{t|1}$, as shown in the equation that follows:

$$f_q(z_{t|0}, a_{t|0}) \leftarrow f_{rew}(z_{t|0}, a_{t|0}) + \gamma f_q(z_{t|1}, a_{t|1}) \tag{1}$$

where $\gamma$ is a pre-determined discount value between 0 and 1 and where $z_{t|1}$ is represented by the equation that follows:

$$z_{t|1} = f_{trans}(z_{t|0}, a_{t|0}), \tag{1A}$$

where $z_{t|1}$ represents a predicted latent state arrived at through the performance of a transition function once. The transition function can be considered to be a step of the look-ahead tree search illustrated in FIG. 4. The number "1" in $z_{t|1}$ represents the number of latent state prediction transition in the look-ahead tree search. The notation $t|1$ represents performing one step of latent state prediction transition from step time t. The notation $z_{t|0}$ may be seen to be representative of $z_{t|0} = f_{enc}(s_t)$ and $a_{t|1}$ is represented by:

$$a_{t|1} \doteq \operatorname{argmax}_{a \in \{f_{\mu_i}(z_{t|1})\}_{i=1,\ldots,N}} f_q(z_{t|1}, a). \tag{1B}$$

Equation 1 can be applied recursively d-times with state prediction and action selection to implement the look-ahead tree search, thereby resulting in an estimation for the state-action value function $$f_q^d(z_{t|l}, a_{t|l}),$$

as defined by the equation that follows:

$$f_q^d(z_{t|l}, a_{t|l}) = \begin{cases} f_q(z_{t|l}, a_{t|l}) & d = 0 \\ f_{rew}(z_{t|l}, a_{t|l}) + \gamma f_q^{d-1}(z_{t|l+1}, a_{t|l+1}) & d > 0 \end{cases} \tag{2}$$

where d is the number of times that Equation 1 is applied recursively (i.e., the number of forward time-steps for which latent states and actions are predicted); additionally, $$z_{t|0} \doteq f_{enc}(s_t), a_{t|0} \doteq a_t,$$

$$z_{t|l} \doteq f_{trans}(z_{t|l-1}, a_{t|l-1}), (l \geq 1) \text{ and}$$

$$a_{t|l} \doteq \operatorname{argmax}_{a \in \{f_{\mu_i}(z_{t|l})\}_{i=1,\ldots,N}} f_q^{d-l}(z_{t|l}, a), (l \geq 1).$$

Figure 4:
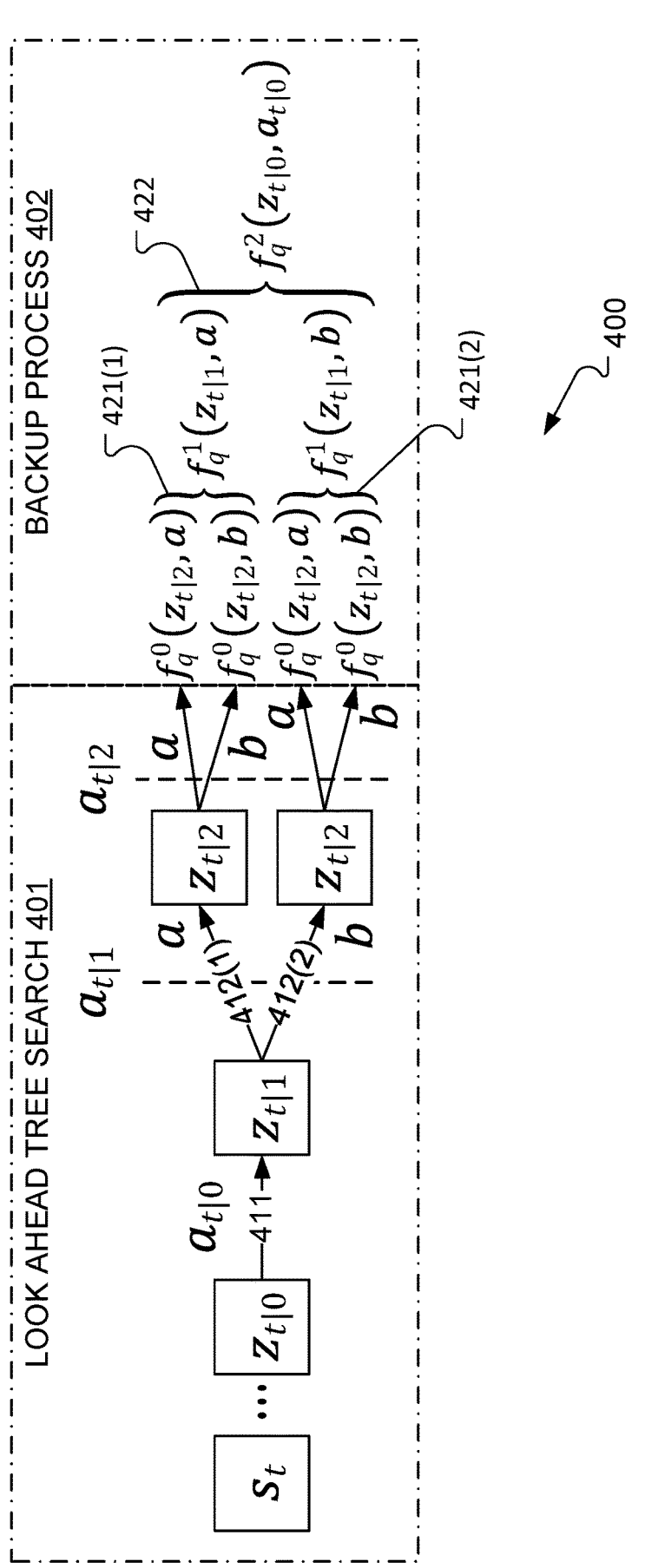
FIG. 4 schematically illustrates a look-ahead tree search for use in the critic of FIG. 3 in accordance with aspects of the present application.

FIG. 4 illustrates an example of a look-ahead tree search and backup process 400 carried out by the critic 104 according to Equation 2. In the example illustrated in FIG. 4, the number, N, of actor neural network functions is 2 and the number, d, of look-ahead time steps is 2. In particular, the look-ahead tree search and backup process 400 of FIG. 4 illustrates the application of Equation 1 recursively to calculate the d-recursive estimation or prediction of the state-action value of the state-action value function, $$f_q^d(z_{t|l}, a_{t|l}),$$

of Equation 2 by the critic neural network 320 of the critic 104.

The look-ahead tree search and backup process 400 of FIG. 4 includes a look-ahead tree search 401 and a backup process 402. The entire look-ahead tree search and backup process 400 is completed at a single time step, t, with the variables indexed by $t|1$ and $t|2$ representing predicted state-action values of the state-action value of the state-action value function, $$f_q^d(z_{t|l}, a_{t|l})$$

for one time step ahead and two time steps ahead, respectively.

A progression through the look-ahead tree search and backup process 400 of FIG. 4 begins with the RL Agent 102 receiving a state, $s_t$, and encoding the state, $s_t$, to the latent state, $z_{t|0}$. An arrow, associated in the look ahead tree search 401 with reference character 411, represents a first transition kernel performing a first transition, $z_{t|1}=f_{trans}(z_{t|0},a_{t|0})$, and two further arrows, associated with reference characters 412(1) and 412(2), represent second transition kernels performing second transitions $z_{t|2}=f_{trans}(z_{t|1},a_{t|1})$. The notation, $z_{t|l}$, with (l=0,1,2), represents a predicted latent state after two steps from time step t. a and b shown in FIG. 4 are representative of actions predicted to be proposed by two actor neural networks 110 and depend on latent state. The brackets "}" in the backup process 402 represent maximization operations to maximize the 2-recursive estimation, $$f_q^2(z_{t|0}, a_{t|0}),$$

of the state-action value function, $Q(s_t,a_t)$.

For example, in each of two first maximization operations 421(1), 421(2) of the backup process 402, a maximum, $$f_q^1,$$

is selected, by the critic neural network 320, from two actions, $$f_q^0.$$

In a second maximization operation 422, a maximum $$f_q^2,$$

is selected, by the critic neural network 320, from the selected maxima, $$f_q^1,$$

from the first two maximization operations 421(1), 421(2). Reward prediction implementation has been omitted from FIG. 4 for simplicity.

It may be shown that the estimated or predicted state-action value of the state-action value function, $$f_q^d(z_{t|l'}, a_{t|l'})$$

output by the critic neural network 320, is fully differentiable with respect to the parameters of critic neural network parameters, $\theta^Q$. Accordingly, the estimated or predicted state-action value of the state-action value function, $$f_q^d(z_{t|l'}, a_{t|l'}),$$

can be used in place of the actual state-action value of the state-action value function, $Q(s_t,a_t)$, when determining the critic gradients for optimizing the critic neural network parameters, $\theta^Q$, and the actor gradients for optimizing the actor ensemble parameters, $\theta^\mu$. It may be considered that the training of the actor neural networks 110 is accomplished by adjusting the actor ensemble parameters, $\theta^\mu$. Similarly, it may be considered that the training of the critic neural network 320 is accomplished by adjusting the critic neural network parameters, $\theta^Q$.

A per-step gradient for adjusting the critic neural network parameters, $\theta^Q$, can be represented as:

$$\nabla_{\theta Q}\left(\frac{1}{2}\left(f_q^d(z_{t|0}, a_{t|0}) - \max_i f_q^d(z_{t+1|0}, f_{\mu_i}(z_{t+1|0}))\right)^2 + \frac{1}{2}(f_{rew}(z_{t|0}, a_{t|0}) - r_{t+1})^2\right)$$

and a per-step gradient for adjusting the actor ensemble parameters, $\theta^\mu$, can be represented as:

$$\sum_{i=1}^N \nabla_a f_q^d(z_{t|0}, a)\big|_{a=f_{\mu_i}(z_{t|0})} \nabla_{\theta^\mu} f_{\mu_i}(z_{t|0}),$$

where $z_{t|0}$ is representative of $f_{enc}(s_t)$ and where $z_{t+1|0}$ is representative of $f_{enc}(s_{t+1})$.

Referring, again, to FIG. 1, an overview of the operation of the RL system 100 will be described in accordance with example embodiments.

Inputs to the RL system 100, include:

N: the number of actors
$\epsilon_t$: a noise process that encourages exploration during training, which can depend on a time step, t;
d: the number of steps for the look-ahead tree search;
$\alpha$: learning step size for training the critic 104;
$\beta$: learning step size for training the plurality of actor neural networks 110;
$f_q$, $f_{enc}$, $f_{rew}$, $f_{trans}$, $f_{\mu_1}$ . . . , $f_{\mu_N}$: functions which are parameterized by $\theta^\mu$ and $\theta^Q$ and approximated by neural networks (representations of $f_q$, $f_{enc}$, $f_{rew}$, $f_{trans}$, $f_{\mu_1}$, . . . , $f_{\mu_N}$ are discussed hereinbefore).

Outputs of the RL system 100 are:
actor ensemble parameters, $\sigma^\mu$; and
critic neural network parameters, $\theta^Q$.

In operation, the actor ensemble parameters, $\theta^\mu$, and the critic neural network parameters, $\theta^Q$, are adjusted, under control of the actor ensemble 103 and the critic 104. The goal of the adjustment is to maximize the state-action value function, $Q(s_t,a_t)$, approximated by the critic neural network 320 of the critic 104 of the RL agent 102.

The RL system 100 operates to train the N actor neural networks 110 in parallel, as well as to train the critic neural network 320 as follows.

Initially, the replay buffer 106 is initialized.

Then, for each time step, t, the following actions (a) to (f) are performed:

(a) The RL agent 102 observes (see FIG. 8, step 802) the state, $s_t$, of the environment 101. At each of the N actor neural networks 110, the actor initial layer 202 (see FIG. 2) implements the encoding function, $f_{enc}$, to transform the state, $s_t$, into an n-dimensional latent state, $z_t \leftarrow f_{enc}(s_t)$. The actor initial layer 202 provides the latent state, $z_t$, to the actor second layers 204. At the critic 104, the critic initial layer 312 (see FIG. 3) implements the encoding function, $f_{enc}$, to transform the state, $s_t$, into the n-dimensional latent state, $z_t \leftarrow f_{enc}$ ($s_t$). The critic initial layer 312 provides the latent state, $z_t$, to the critic middle layers 314.

(b) Each of the N actor neural networks 110 receives the state (step 804) a respective action, such that the actor ensemble 103 outputs N estimated or predicted actions 130-1, 130-2, . . . , 130-N, $a_i = f_{\mu_i}(z_t) = \mu_i(s_t)$. The actor ensemble 103 provides the actions 130 to the critic 104 and to the action selection function 108. The critic neural network 320 of the critic 104 receives each of the actions 130 and outputs (step 806), an estimated or predicted state-action value for the state-action value function, $Q(s_t, a_t)$ for each action. As mentioned above, the critic neural network 320 is representative of a value prediction model. The critic 104 provides the estimated or predicted state-action values of the state-action value function, $Q(s_t, a_t)$ to the action selection function 108. The action selection function 108 selects (step 808) the "best" action. The best action is the one of the N actions that is associated with a maximum estimated predicted state-action value of the state-action value function, $Q(s_t, a_t)$ as received from the critic neural network 320. It may also be considered that the actor ensemble 103 has appended noise, $\epsilon_t$, to the selected action. Accordingly, the action, $a_t$, selected by the action selection function 108 may be represented as:

$$a_t \leftarrow \operatorname{argmax}_{a \in \{f_{\mu_i}(z_t)\}_{i=1,\ldots,N}} f_q^d(z_t, a) + \epsilon_t.$$

(c) The action selection function 108 provides (step 810) the selected action, $a_t$, to the environment 101. After receipt of the selected action, $a_t$, an AI system that includes the RL agent 102 carries out the selected action, $a_t$, in the environment 101 performs the selected action, $a_t$. As a result of the performance of the selected action, the RL agent 102 receives (step 812), from the environment 101, a reward, $r_{t+1}$, and an updated state, $s_{t+1}$. In particular, the replay buffer 106 receives (step 812) the reward, $r_{t+1}$.

(d) The replay buffer 106 stores a tuple, ($s_t$, $a_t$, $r_{t+1}$, $s_{t+1}$), for the one time step transition of the environment from $s_t$ to $s_{t+1}$. In some examples, the critic neural network 320 and the actor neural networks 110 include batch normalization layers (not shown) that act to minimize covariance shift during training.

(e) A batch of the transition tuples is sampled from the plurality of the transition tuples stored in the reply buffer 106. Each experience tuple in the batch of transitions are denoted as (s, a, r, s'), where "'" denotes the batch values for the next time step.

(f) For each experience tuple, (s, a, r, s'), in the sample batch of experience tuples, the following operations are performed to output a per time step update for the critic neural network parameters, $\theta^Q$, and a per time step update for the actor ensemble parameters, $\theta^\mu$:

(i) The encoding function, $f_{enc}$, is used at the critic initial layer 312 to transform state, s, into an n-dimensional latent state, z. For a current time step, $z \leftarrow f_{enc}(s)$ and for a subsequent time step, $z' \leftarrow f_{enc}(s')$.

(ii) A target state-action value (denoted by y) may be determined by, the critic parameter update determiner 318, based on a plurality of state-action values for the state-value function estimated or predicted by the layers 314, 316 of the critic neural network 320 for the next latent state z'. The layers 314, 316 of the critic neural network 320 uses the look-ahead tree search described in view of FIG. 4 to estimate or predict a state-action value for the state-value function, with an estimated or predicted state-action value associated with each of the actors neural networks 110. The critic parameter update determiner 318 may select a maximum from among the predicted state-action values. Determining the target state-action value may be accomplished in the following two steps:

$$y' \leftarrow \begin{cases} 0 & \text{if } s \text{ is terminal} \\ \max_i f_q^d\left(z', f_{\mu_i}(z')\right) & \text{otherwise} \end{cases} \quad (3)$$

$$y \leftarrow r + \gamma y',$$

where: z' is the latent state for the state of subsequent time step, which is represented by $z' \leftarrow f_{enc}(s')$; r is the immediate reward received, by the critic parameter update determiner 318 from the replay buffer 106; and y' is a maximum state-action value of the next latent state (e.g., z'). As an aside, a set of data related to sequential transitions may be grouped, in the relay buffer 106, into episodes. Each episode covers a series of transitions and eventually ends with a last state. The last state in an episode may be called a "terminal state" and may be marked as such by the environment 101. At the end of a particular episode, the environment 101 may be reset such that the recording of a new episode may begin. One way to define a particular episode is to predetermine a number of transitions. Accordingly, it may be considered to make sense that the target Q value for the next state is zero in the case wherein the present state is terminal.

(iii) The reward prediction function, $f_{rew}$, is used, by the layers 314, 316 of the critic neural network 320, to determine a predicted reward r̂ for a current latent state, z, and a current action, a. The determining of the predicted reward, r̂, may be represented by the following equation:

$$\hat{r} \leftarrow f_{rew}(z, a). \quad (4)$$

(iv) The critic parameter update determiner 318 may train the critic neural network 320, via a gradient descent. The training of the neural network 320 may be seen to have two goals. The first of the two goals involves minimizing the TD error. The TD error may be determined, by the loss determiner 322, as a difference between a determined state-action value, $$f_q^d(z, a),$$

and a target state-action value, y. The second of the two goals involves grounding the predicted reward, r̂. So-called grounding of the predicted reward involves subtracting a received reward from the predicted reward. Accordingly, the critic parameter update determiner 318 may determine (step 814) a per time step update ($\Delta \theta^Q$) for the critic neural network parameters, $\theta^Q$, as represented by Equation 5, as follows:

$$\theta^Q \leftarrow \theta^Q - \alpha \nabla_{\theta^Q} \left( \frac{1}{2} (f_q^d(z, a) - y)^2 + \frac{1}{2} (\hat{r} - r)^2 \right), \tag{5}$$

where y is the target state-action value, as found using Equation 3, for a next latent state, $z_{t+1}$, and a best action selected from the N actor neural networks 110 using the neural network 320 by performing the look-ahead tree search; a is the action from the transition in the sampled batch of experience tuples; and r̂ is represented by Equation 4. As shown from Equation 5, the critic parameter update determiner 318 may determine a gradient for the critic neural network parameters, $\theta^Q$, through use of the following equation:

$$\nabla_{\theta^Q} \left( \frac{1}{2} (f_q^d(z, a) - y)^2 + \frac{1}{2} (\hat{r} - r)^2 \right). \tag{6}$$

(v) The plurality of actor neural networks 110 are trained, in parallel, to optimize the actor ensemble parameters, $\theta^\mu$, via a gradient ascent algorithm, to maximize each state-action value associated with the action output from each actor neural network 110 to, thereby, find a global maximum. The actor parameter update determiner 112 may determine (step 816) a per-step update ($\Delta\theta^\mu$) to the actor ensemble parameters, $\theta^\mu$, as represented by the following equation:

$$\theta^\mu \leftarrow \theta^\mu + \beta \nabla_{\theta^\mu} \sum_{i=1}^{N} \nabla_b f_q^d(z, b)|_{b=f_{\mu_i}(z)} \nabla_{\theta^\mu} f_{\mu_i}(z) \tag{7}$$

where $$\nabla_b f_q^d(z, b)|_{b=f_{\mu_i}(z)} \nabla_{\theta^\mu} f_{\mu_i}(z)$$

may be used, by the actor parameter update determiner 112, to determine a gradient for the actor ensemble parameters $\theta^\mu$;

$$\nabla_b f_q^d(z, b)|_{b=f_{\mu_i}(z)}$$

is a respective gradient for the state-action value function $$f_q^d(z, b)|_{b=f_{\mu_i}(z)}$$

for a corresponding actor neural network, 110-i, at a latent state, z; and $\nabla_{\theta^\mu} f_{\mu_i}(z)$ is a respective gradient function for the action function, $f_{\mu_i}(z)$, for corresponding actor neural network 110-i, at the latent state, z.

As shown in FIG. 1, the replay buffer 106, at a given time step, t, receives a state, $s_t$, a reward, $r_t$, an action, $a_t$. More specifically, the replay buffer 106 receives the state, $s_t$, and the reward, $r_t$, from the environment 101. The critic parameter update determiner 318 receives a critic loss value, including the TD error, derived, by the loss determiner 322, from state-action values estimated or predicted by the critic neural network 320.

The critic 104 receives, from the environment 101, the state, $s_t$, the action, $a_t$, a next reward, $r_{t+1}$, and a next state, $s_{t+1}$. The critic 104 is configured to provide the plurality of state-action values, 105-1, 105-2, . . . , 105-N (determined in step 806), to the action selection function 108.

It may be considered that one result of training the plurality of N actor neural networks 110 is that an optimal set of actor ensemble parameters, $\theta^\mu$, will have been determined by the action selection function 108 such that, responsive to receiving any state, $s_t$, from the environment 101, one of the actor neural networks 110 will output an action that causes the state-action value function to have a maximum state-action value.

In at least some examples, once the optimized actor ensemble parameters, $\theta^\mu$, are determined, the training of the RL agent 102 is completed. The replay buffer 106 may be removed from the RL agent and the trained RL agent 102 may be deployed in an AI system for continuous control applications. For example, the RL agent 102 may be deployed in an autonomous vehicle agent and can be used to determine a continuous action value, such as a steering angle, based on a state.

A pseudocode representation of instructions follows, for a processing system to implement the RL system 100 of FIG. 1.

Input:
  N: number of actors
  $\epsilon_t$: a noise process
  d: plan depth
  α: learning step size for use by the critic parameter update determiner 318 when training the critic 104;
  β: learning step size for use by the actor parameter update determiner 112 when training the plurality of actor neural networks 110;
  $f_q$, $f_{enc}$, $f_{rew}$, $f_{trans}$, $f_{\mu_1}$, . . . , $f_{\mu_N}$: neural network approximator functions, which are parameterized by the critic parameters, $\theta^Q$, and the actor parameters, $\theta^\mu$
Output:
  the critic neural network parameters, $\theta^Q$; and
  the actor ensemble parameters, $\theta^\mu$.
  The pseudocode representation begins with initialization of the replay buffer $\mathcal{D}$ 106.

```
for each time step, t, do
| z_t ← f_enc(s_t)
| a_t ← argmax_{a∈{f_μi(z_t)}_{i=1,...,N}} f_q^d(z_t, a) + ε_t
| Execute the action, a_t, get reward, r_{t+1}, and a next state, s_{t+1}
| Store tuple, (s_t, a_t, r_{t+1}, s_{t+1}), into D
| Sample a batch of transitions B from D
| for each transition s, a, r, s' in B do
  | z ← f_enc(s)
  | z' ← f_enc(s')
  | y' ← { 0                              if s' is terminal
  |        max_i f_q^d(z', f_μi(z'))       otherwise
  | y ← r + γy'
  | r̂ ← f_rew(z, a)
  | θ^Q ← θ^Q − α∇_{θ^Q} ( 1/2(f_q^d(z, a) − y)^2 + 1/2(r̂ − r)^2 )
  | θ^μ ← θ^μ + β∇_{θ^μ} Σ_{i=1}^{N} ∇_b f_q^d(z, b) |_{b=f_μi(z)} ∇_{θ^μ} f_μi(z)
| end
end
```

Figure 5:
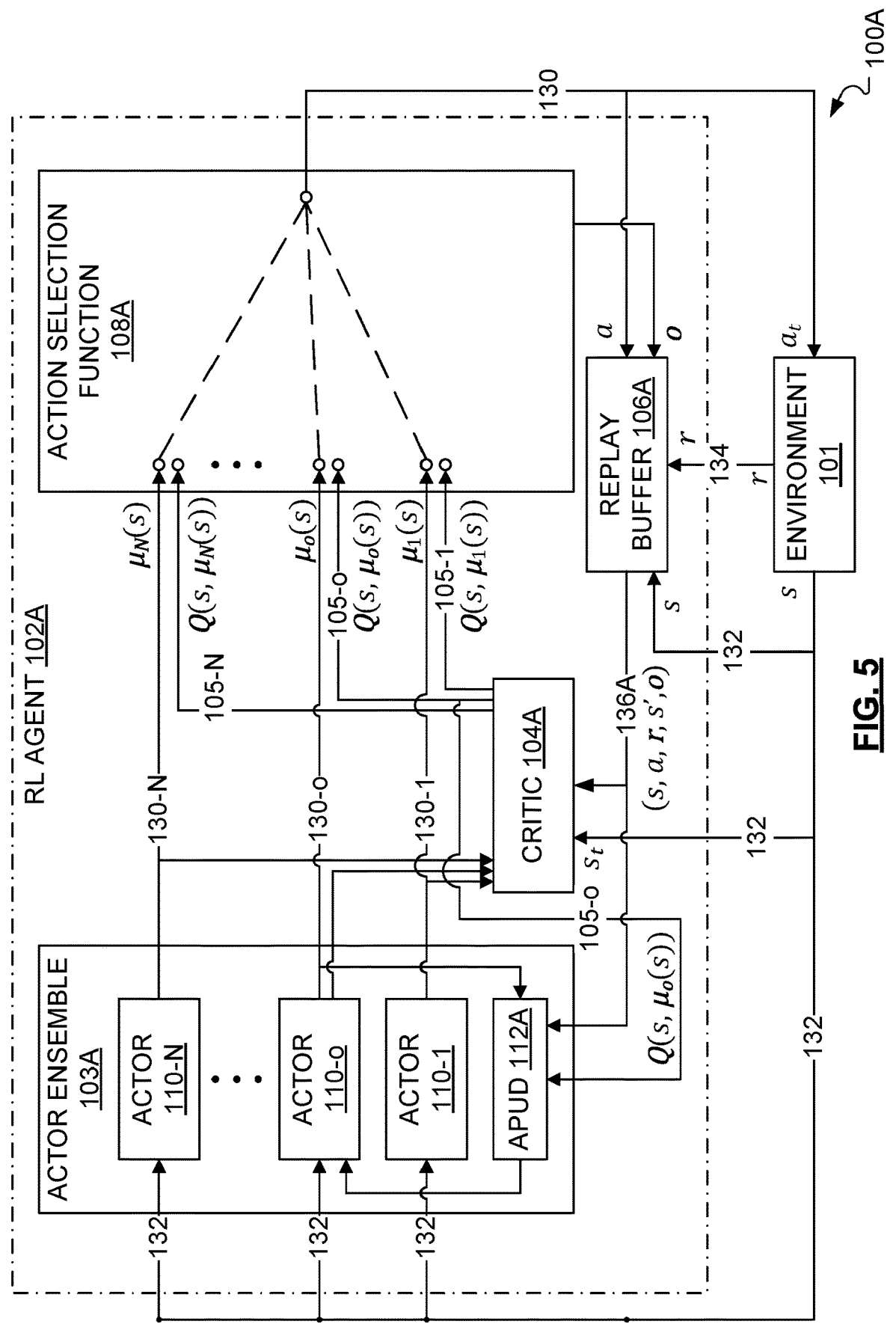
FIG. 5 schematically illustrates a reinforcement learning system in accordance with another aspect of the present application.

FIG. 5 illustrates an example RL system 100A that includes, in accordance with a further example embodiment, an RL agent 102A, a critic 104A an actor ensemble 103A, an action selection function 108A and a replay buffer 106A. The environment 101 is familiar from FIG. 1. The RL system 100A of FIG. 5 is similar to the RL system 100 of FIG. 1, except for differences that will now be described.

In operation in view of FIG. 5, an output state-action value 105-o is received from the critic 104A by an actor parameter update determiner 112A, which is part of the actor ensemble 103A. This occurs in the example RL system 100A of FIG. 5 in a manner similar to the manner in which output of the plurality of state-action values 105 are received from the critic 104 by the actor parameter update determiner 112, which is part of the actor ensemble 103 in the RL system 100 of FIG. 1. The designated task for the actor parameter update determiner 112A of FIG. 5 is the determination (step 816) of updates to the actor ensemble parameters, $\theta^\mu$.

In contrast to FIG. 1, rather than the critic 104A providing a plurality of state-action values to the actor parameter update determiner 112A, a best actor among the actors 110 was selected by the action selection function 108A. The best actor neural network 110 is denoted as o. It follows that the critic 104A needs only to provide a state-action value 105-o to the best actor neural network 110-o for the determination (step 816) of the update for the parameters of the best actor neural network 110-o. Hence only the actor parameters of the best actor neural network 110-o are updated.

For one step transition, a transition tuple ($s_t$, $a_t$, $r_{t+1}$, $s_{t+1}$, o) is stored in the replay buffer 106. The per time step update for the critic neural network parameters, $\theta^Q$, for the RL system 100A of FIG. 5 is similar to the per time step update (, $\Delta\theta^Q$) for the critic neural network parameters, $\theta^Q$, for the RL system 100 of FIG. 1 and can be represented by previously presented Equation 5:

$$\theta^Q \leftarrow \theta^Q - \alpha\nabla_{\theta^Q}\left(\frac{1}{2}\left(f_q^d(z, a) - y\right)^2 + \frac{1}{2}(\hat{r} - r)^2\right) \quad (5)$$

Regarding the actor ensemble parameters, $\theta^\mu$, the per time step update ($\Delta\theta^\mu$) for the actor parameters, $\theta^\mu$, for the RL system 100A of FIG. 5 is represented by the following equation:

$$\theta^\mu \leftarrow \theta^\mu + \beta\nabla_b f_q^d(z, b)\,|_{b=f_{\mu_o}(z)}\,\nabla_{\theta^\mu}f_{\mu_o}(z) \quad (8)$$

where $$\nabla_b f_q^d(z, b)\,|_{b=f_{\mu_o}(z)}$$

is a gradient for the Q function $$f_q^d(z, b)|_{b=f_{\mu_0}(z)}$$

for the selected actor neural network 110-o, for latent state, z, (encoded from current state, s, from the transition in the sampled batch of transition tuples using the encoding function, $f_{enc}$; and $\nabla_{\theta^\mu}f_{\mu_o}(z)$ is a gradient for the action function, $f_{\mu_o}(z)$, for the selected actor neural network, $\mu_o$, which is computed from latent state z.

With reference to the RL system 100A of FIG. 5, the inputs to the critic 104A are similar to the inputs of the critic 104 in the RL system 100 of FIG. 1. In respect of the actor neural networks 110, in the RL system 100A of FIG. 5, the critic 104A provides the single state-action value 105-o to the actor parameter update determiner 112A, to determine the update for the actor parameters, $\theta^{\mu i}$, of the selected actor neural network 110-o. After the completion of the training of the selected actor neural network 110-o, the action selection function 108A routinely outputs, to the environment 101, the action, $a_t$, from the selected actor neural network 110-o.

Thus, in the RL system 100A of FIG. 5, after an initial time step, in which the best actor neural network 110-o is selected by the action selection function 108A, only the selected actor neural network 110-o, is trained. By training only the selected actor neural network 110-o that routinely outputs the best action, training efficiency may be boosted for some cases.

Figure 6:
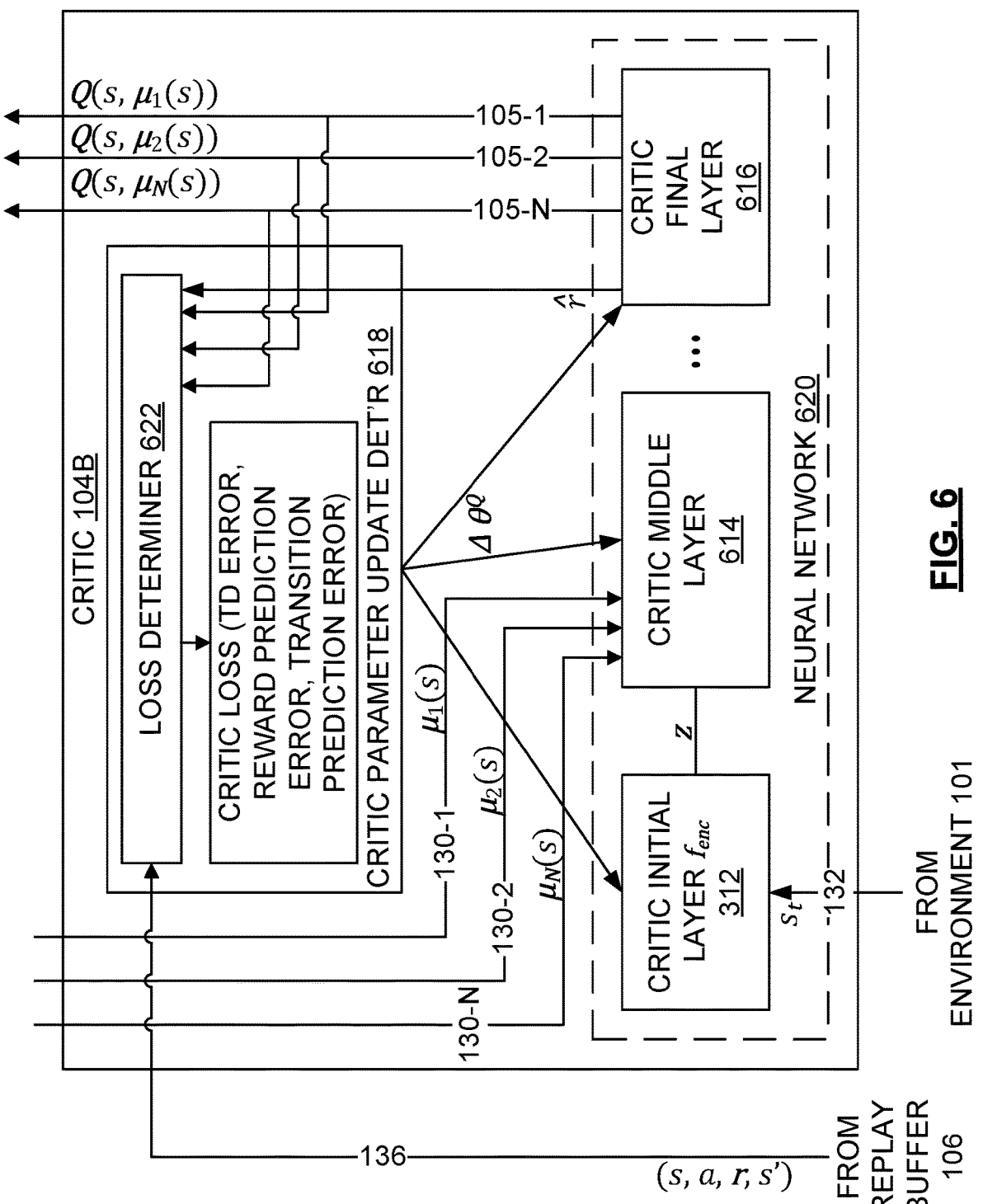
FIG. 6 schematically illustrates an example of the critic of FIG. 1 that includes a neural network represented by a transition model in accordance with aspects of the present application.

FIG. 6 schematically illustrates another example of the critic 104 of FIG. 1 in accordance with aspects of the present application. The critic 104B illustrated in FIG. 6 includes a critic neural network 620 implemented as a deep neural network. The deep neural network includes multiple layers and is representative of a transition model 620. The deep neural network includes a critic initial layer 312 (similar to critical initial layer of the critic 104 illustrated in FIG. 3), a plurality of critic middle layers 614 and a critic final layer 616. The critic layers 312, 614, 616 receive updates for the critic neural network parameters $\theta^Q$ from a critic parameter update determiner 618. The critic parameter update determiner 618 calculates a loss value for the critic neural network 602 using a loss determiner 622, which assists in determining an update to the critic neural network parameters, $\theta^Q$.

Calculations and algorithms applied in the example represented by FIG. 6 are similar to counterpart calculations and algorithms applied in the example represented by FIG. 1 except that, in the example represented by FIG. 6, during the determining of the update for the critic neural network parameters $\theta^Q$ and the update for the actor ensemble parameters, $f_q$ is used instead of $$f_q^d.$$

Therefore, the target state-action value (denoted by y) may be determined according to the following equation:

$$y' \leftarrow \begin{cases} 0 & \text{if } s' \text{ is terminal} \\ \max_i f_q(z', f_{\mu_i}(z')) & \text{otherwise} \end{cases} \quad (9)$$
$$y \leftarrow r + \gamma y'$$

The per time step update ($\Delta\theta^Q$) for the critic neural network parameters, $\theta^Q$, for the critic 104B of FIG. 6 is represented by the following equation:

$$\theta^Q \leftarrow \theta^Q - \alpha\nabla_{\theta^Q}\left(\frac{1}{2}(f_q(z, a) - y)^2 + \frac{1}{2}(\hat{r} - r)^2 + \frac{1}{2}\|f_{trans}(z, a) - z'\|^2\right) \quad (10)$$

where $f_{trans}(z,a)$ represents a transition function which is part of the transition model 620 and z' represents the next latent state.

The per-step update for the actor ensemble parameters, $\theta^\mu$, in the cases wherein the critic neural network 620 of the critic 104B of FIG. 6 is used may be represented by the following equation:

$$\theta^\mu \leftarrow \theta^\mu + \beta\nabla_{\theta^\mu} \sum_{i=1}^{N} \nabla_b f_q(z, b)\,|_{b=f_{\mu_i}(z)}\, \nabla_{\theta^\mu} f_{\mu_i}(z) \qquad (11)$$

where $$\nabla_b f_q(z, b)|_{b=f_{\mu_i}(z)}$$

is a respective gradient for the Q function $f_q(z,b)$ for a corresponding actor neural network 110-i, at latent state, z, (encoded from current time step state, s, using the encoding function, $f_{enc}$); and $\nabla_{\theta^\mu} f_{\mu_i}(z)$ is a respective gradient for the action function, $f_{\mu_i}(z)$, for a corresponding actor neural network 110-i, at the latent state, z.

As presented in FIG. 6, the critic 104B, receives a transition tuple, (s, a, r, s'), and a critic loss derived using the output of the neural network 620 that is representation of a transition model. More specifically, the critic 104B receives the tuple, (s, a, r, s'), from the replay buffer 106. The critic parameter update determiner 618 calculates the critic loss in the loss determiner 622 using the output of the neural network 620.

The critic 104B then provides the plurality of state-action values 105 to the APDU 112 of the actor ensemble 103. After training, the plurality of N actor neural networks 110 each is provided with the state-action value estimated or predicted by the neural network 620 to output an action causing the state-action value function to have a maximum Q value. The action selection function 108 then selects one of the actions and outputs the selected action to the environment 101. Thus, a global maximum may be easily found when different respective actor neural networks 110 are in charge of different regions for local maximum searching with greater accuracy.

By using the transition model to train the plurality of actor neural networks 110 and the critic neural network 620, a global maximum may be found easily and with great accuracy. Indeed, each actor neural network 110 searches, and is in charge of, a certain area of the state-action function. Conveniently, this may help to eliminate trapping in a local maximum for a single actor.

A pseudocode representation of instructions follows, for a processing system to implement an RL system 100 using the critic 104B of FIG. 6.

Input:
  N: number of actors
  $\epsilon_t$: a noise process
  d: plan depth
  $\alpha$: learning step size for training the critic 104B;
  $\beta$: learning step size for training the plurality of actor neural networks 110;
  $f_q$, $f_{enc}$, $f_{rew}$, $f_{trans}$, $f_{\mu_1}$, . . . , $f_{\mu_N}$: functions which approximated by the critic neural network and are parameterized by the critic neural network parameters, $\theta^Q$, and the actor ensemble parameters, $\theta^\mu$ Output:
  the critic neural network parameters, $\theta^Q$; and
  the actor ensemble parameters, $\theta^\mu$.

20

The pseudocode representation begins with initialization of the replay buffer $\mathcal{D}$ 106.

```
for each time step, t, do
  z_t ← f_enc(s_t)

a_t ← argmax_{a∈{f_{μ_i}(z_t)}_{i=1,...,N}} f_q^d(z_t, a) + ε_t

Execute the action, a_t, get reward, r_{t+1}, and a next state, s_{t+1}
  Store tuple, (s_t, a_t, r_{t+1}, s_{t+1}), into D
  Sample a batch of transitions B from D
  for each transition s, a, r, s' in B do z ← f_enc(s)
    z' ← f_enc(s')
    y' ← { 0                        if s' is terminal
         { max_i f_q^d(z', f_{μ_i}(z'))   otherwise
    y ← r + γy'
    r̂ = f_rew(z, a)
    θ^Q ← θ^Q - α∇_{θ^Q}( 1/2(f_q(z, a) - y)^2 + 1/2(r̂ - r)^2 + 1/2||f_trans(z, a) - z'||^2 )
    θ^μ ← θ^μ ∓ β∇_{θ^μ} Σ_{i=1}^N ∇_b f_q(z, b)|_{b=f_{μ_i}(z)} ∇_{θ^μ} f_{μ_i}(z)

end
end
```

Figure 7:
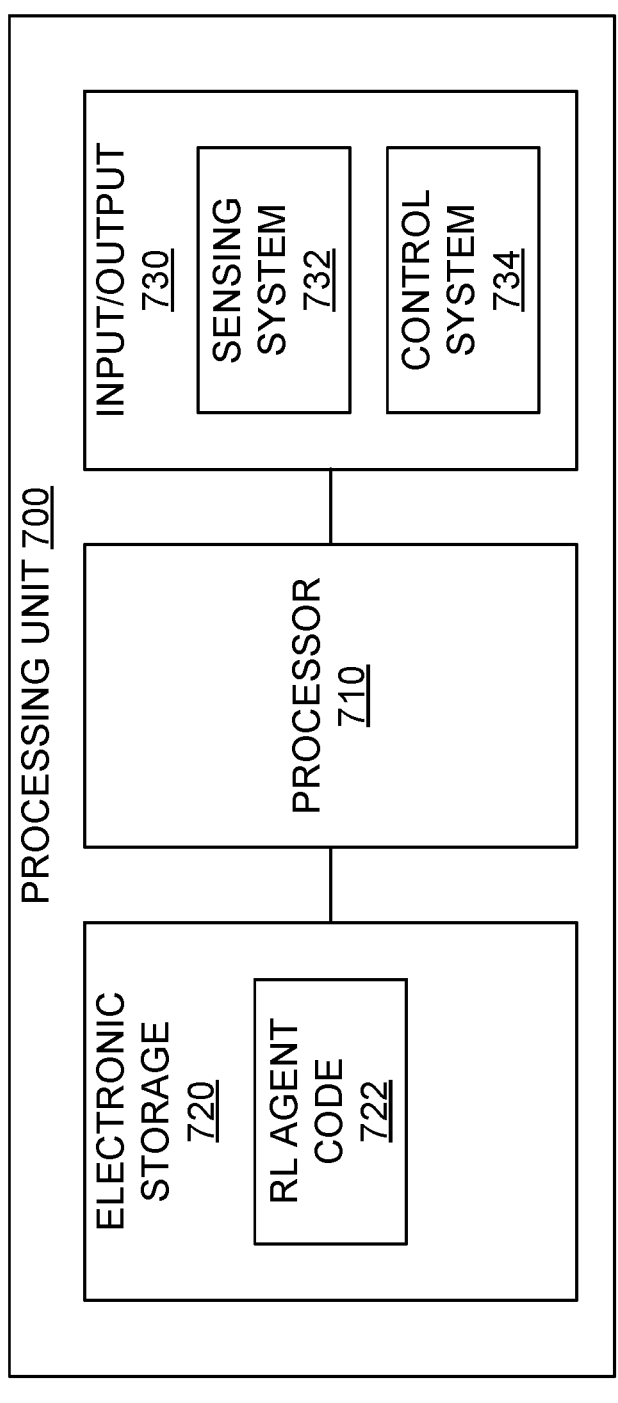
FIG. 7 illustrates, in a block diagram, a processing system in accordance with aspects of the present application.

FIG. 7 illustrates an example of a processing unit 700 that may be used to implement the RL agent 102 and, in some examples, a simulated version of the environment 101. The processing unit 700 may also be used to implement a trained RL agent 102 that incorporates the optimized actor ensemble parameters $\theta^\mu$ determined by the actor parameter update determiner 112 (FIG. 1). The processing unit 700 may be implemented in a vehicle or robot, for just two examples. The processing unit 700 may also be external to a vehicle or robot and used to implement, for example, the system 100 to train and test the RL agent 102 outside of a real-world environment.

Beyond vehicle or robot, the teachings of the present disclosure may be implemented in other forms of AI systems used for continuous control applications, such as autonomous or semi-autonomous vehicles including, for example, trams, subways, trucks, buses, surface and submersible watercraft and ships, aircraft, drones (also called unmanned aerial vehicles or "UAVs"), warehouse equipment, construction equipment or farm equipment, and may include vehicles that do not carry passengers as well as vehicles that do carry passengers. Example non-vehicular devices for which aspects of the present application may be suitable for implementation include, for example, autonomous vacuum cleaners and autonomous lawn mowers.

In this example, the processing unit 700 includes one or more physical processors 710 (e.g., a microprocessor, a graphical processing unit, a digital signal processor or other computational element) coupled to an electronic storage 720 and coupled to one or more input and output interfaces or devices 730. The electronic storage 720 can include tangible memory (for example, flash memory) and transient memory (for example, Random Access Memory). The tangible memory may store instructions, data and/or software modules for execution by the processor 700 to carry out the examples described herein. The electronic storage 720 may include any suitable volatile and/or non-volatile storage and retrieval device. The electronic storage 720 may include one or more of random access memory (RAM), read only memory (ROM), hard disk, optical disc, subscriber identity module (SIM) card, memory stick, secure digital (SD) memory card, and the like.

In the example illustrated in FIG. 7, computer instructions (e.g., code 722 for implementing the RL agent 102 of FIG. 1) and data are stored in the electronic storage 720 of the processing unit 700, thereby enabling the processer 710 to implement the RL agent 102 of FIG. 1 or the RL agent 102A of FIG. 5 and, thereby, implementing the actor neural networks 110 and the critics 104, 104A, 104B disclosed herein.

In FIG. 7, the input and output interfaces or devices 730 may include a sensing system 732. As discussed hereinbefore, the environment 101 can be represented through real-time measurements made by the sensing system 732. The sensing system 732 may be, for example, implemented as: a camera system; a lidar system; a radar system; an inertial sensing system; and a radio frequency receiver system, among other sensing systems.

The input and output interfaces or devices 730 of FIG. 7 may also include a control system 734. In operation, the processor 710 executing the RL agent code 722 produces values in a continuous action space. The values may be received, from the processor 710, at the control system 734. The control system 734 may then interpret the values. Responsive to interpreting the values, the control system 734 may cause an action to take place for the vehicle in which the processing unit is installed.

Figure 8:
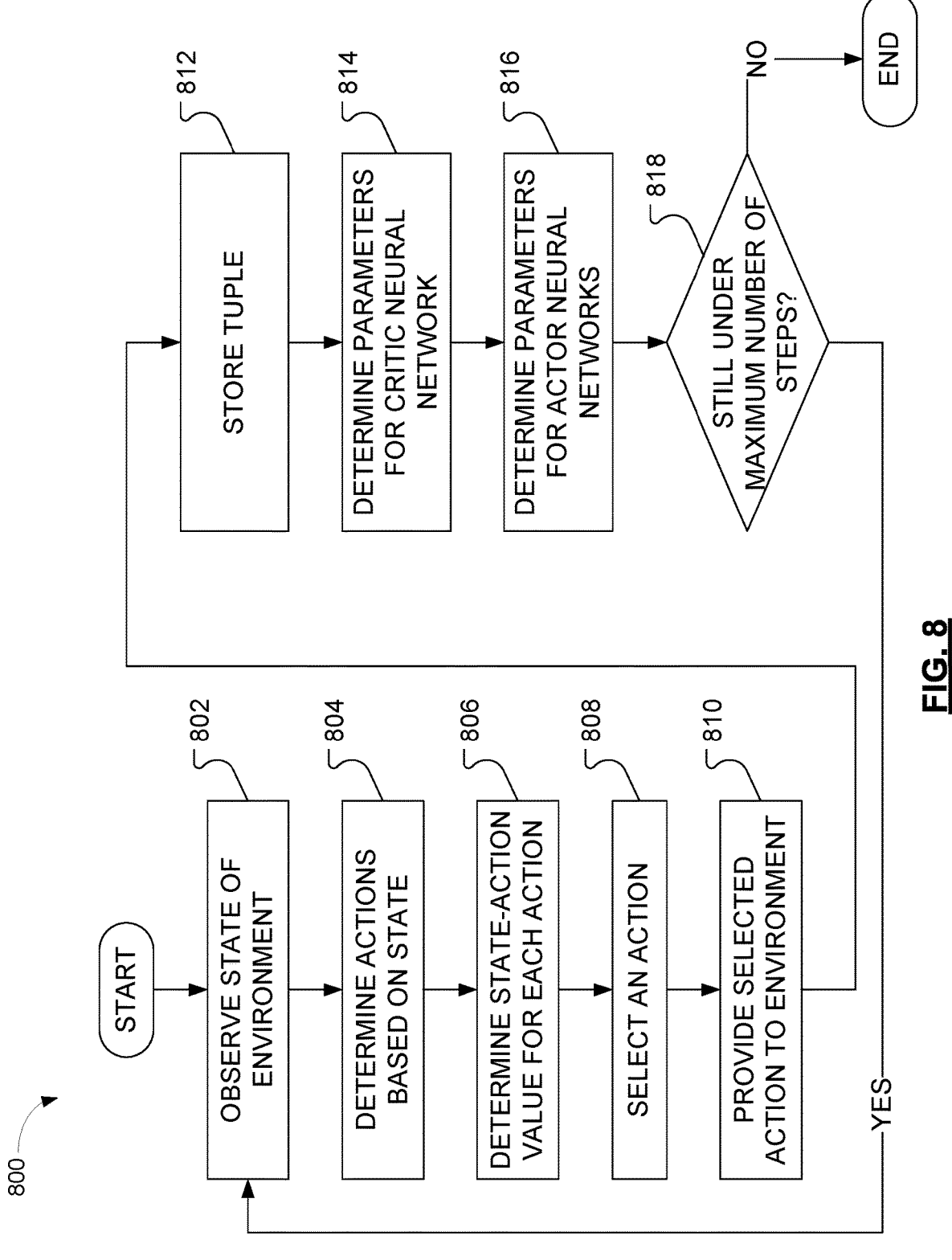
FIG. 8 illustrates steps in an example method that may be carried out by the reinforcement learning system of FIG. 1 in accordance with aspects of the present application.

FIG. 8 illustrates steps in an example training method 800 that may be carried out by the system 100 of FIG. 1 to train the RL agent 102 of FIG. 1. Initially, the actor ensemble 103 of the RL agent 102 observes (step 802) a state, $s_t$, of the environment 101. Each actor neural network 110 among the N actor neural networks 110 receives the state, $s_t$, and outputs (step 804) a predicted action $a_t$ for the state based on the deterministic policy approximated by the parametrized actor neural networks 110. The critic neural network 320 of the critic 104 receives and outputs (step 806) a predicted state-action value for the state-action value function, $Q(s_t, a_i)$ for each action, $a_t$. The critic 104 provides the predicted state-action values, to the action selection function 108.

The action selection function 108 receives the actions $a_t$ output by each actor neural network 110 and a corresponding state-action value provided by the critic 104, and selects (step 808) a single action, $a_t$, from among the N actions output from the N actor neural networks 110 having a maximum state-action value. The RL agent 102 then provides (step 810) the action, $a_t$, to the environment 101. That is, the RL agent 102 causes an AI system that includes the RL agent 102 to carry out the action, $a_t$, in the environment 101. Responsive to the action, $a_t$, having been carried out in the environment 101, the state of the environment 101 changes to a new state, $s_{t+1}$. Additionally, the environment 101 produces a reward, $r_{t+1}$. The replay buffer 106 stores a tuple (step 812) comprising the selected action, $a_t$, an indication of the new state, $s_{t+1}$, and the reward, $r_{t+1}$.

Based upon a tuple that includes the original state, $s_t$, the action, $a_t$, the new state, $s_{t+1}$, and the reward, $r_{t+1}$, which are stored in the reply buffer 106 from which training batch of experience or transition tuples is sampled, the critic 104 determines a respective state-action value for each actor neural network 110. Based on the state-action values, the critic parameter update determiner 318 may determine (step 814) a per time step update $\theta^Q$ for the critic parameters, $\theta^Q$, and the actor parameter update determiner 112 may determine (step 816) a per-step update for the actor parameters, $\theta^\mu$. The critic 104 then determines (step 818) whether the number of time steps has reached a predetermined maximum number of time steps.

After determining (step 818) that fewer than the predetermined maximum number of iterations have been carried out by the method 800, the method 800 returns to the beginning, where the actor ensemble 103 observes (step 802) the new state, $s_{t+1}$, of the environment 101.

After determining (step 818) that the predetermined maximum number of time steps have been carried out by the method 800, the training method 800 of FIG. 8 may be considered to be complete.

The present disclosure provides a method of training a reinforcement learning based software agent of an AI system that includes training a plurality of actor neural networks concurrently with the training of a critic neural network to generate an optimal set of actor parameters and an optimal set of critic parameters, respectively. The optimal parameters preferably act to maximize a state-action value function and minimize TD error.

Aspects of the method may be particularly advantageous in continuous control of AI systems in complicated scenarios, such as in a parking operation or in the control of steering angles when the RL agent 102 is deployed in an autonomous driving vehicle. During the continuous control, the action space is continuous, such as steering angles in dynamic environment with frequent and dramatic changes.

The RL agent 102 provided by the present disclosure use an actor ensemble (i.e., a plurality of actor neural networks) to locate a global maximum. The use of the actor ensemble be seen to help to eliminate issues of an implementation of a gradient ascent algorithm becoming trapped at a local maximum during searching, as may be found to occur when using a single actor in conventional methods. Moreover, for actor selection in continuous action space, a look-ahead tree search with a model is performed to enable the state-action value function to be more accurate, such as a value prediction model or a transition model. Such a method to output optimal actor parameters and optimal critic parameters may enable various tasks, such as parking operations in autonomous vehicle operation, to be completed in dynamic environments and in a continuous action space.

Aspects of the present application disclose a method for training a reinforcement learning agent to output actions from a continuous action space. The method includes providing an actor ensemble that includes a plurality of actor neural networks that each output a respective action from the continuous action space in response to an observed state of an environment, providing a critic neural network that implements a state-action value function indicating an impact of an action on the environment based on a reward from the environment and the observed state of the environment and training the actor ensemble and the critic neural network to maximize a state-action value from the state-action value function over successive time steps. The training includes, in each time step, selecting from the respective actions output by the plurality of actor neural networks the action that will provide a best state-action value from the state-action value function, applying the selected action to the environment and, based on an observed state of the environment of in response to the selected action, determine a gradient ascent for the plurality of actor neural networks to improve the state-action value and determine a gradient descent for the critic neural network.

Other aspects of the present application disclose a system comprising a processor and a memory coupled to the processor, the memory storing executable instructions. The executable instructions, when executed by the processor, cause the processor to provide an actor ensemble that includes a plurality of actor neural networks that each output a respective action from the continuous action space in response to an observed state of an environment, provide a critic neural network that implements a state-action value function indicating an impact of an action on the environment based on a reward from the environment and the observed state of the environment and train the actor ensemble and the critic neural network to maximize a state-action value from the state-action value function over successive time steps. The training includes, in each time step, selecting from the respective actions output by the plurality of actor neural networks the action that will provide a best state-action value from the state-action value function, applying the selected action to the environment and, based on an observed state of the environment of in response to the selected action, determine a gradient ascent for the plurality of actor neural networks to improve the state-action value and determine a gradient descent for the critic neural network.

The method of the present disclosure may continually optimize selection of actions to be performed by for example a vehicle control system during various scenarios (e.g., autonomous parking or driving) by simulating possible actions. The method is dynamic and iterative and the operations of the method should not be viewed as being limited to being performed in any particular order.

The teachings of the present disclosure may be seen to provide a method of training a reinforcement learning based software agent that includes a plurality of actor neural networks in a continuous action space for locating a global maximum. Compared with other deep reinforcement learning approaches, such as Deep Q-Network (DQN), Deep Deterministic Policy Gradient (DDPG) and TreeQN, aspects of the present disclosure may be seen to improve accuracy and efficiency of a software agent to select actions by using the optimal actor parameters and optimal critic parameters, as discussed hereinbefore. For at least these reasons, it is believed that the method of the present disclosure may provide more stable control in continuous action space and boost performance of AI systems that include such software agents significantly.

Although the present disclosure has been described in the context of example methods for autonomous driving or robot controlling operations, it is contemplated that the methods described herein could be used in other AI applications to predict a subsequent state of another type of object and its environment, which may be real or virtual, using a neural network and selection of an action for that object. For example, the methods of the present disclosure may be used in gaming or other simulated applications, industrial robotics, or drone navigation.

Further, it will be appreciated that the methods and apparatus disclosed herein may be adapted beyond any vehicle to other applications, such as robotic applications. Examples include industrial machinery, photography, office equipment, power generation and transmission.

The coding of software for carrying out the methods described hereinbefore is expected to be within the scope of a person of ordinary skill in the art having regard to the present disclosure. Machine-readable code executable by one or more processors of one or more respective devices to perform the above-described method may be stored in a machine-readable medium such as a memory of a vehicle control system or a memory of a neural network controller (not shown). The steps and/or operations in the flowcharts and drawings described herein are for purposes of example only. There may be many variations to these steps and/or operations without departing from the teachings of the present disclosure. For instance, the steps may be performed in a different order or steps may be added, deleted or modified.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of using a reinforcement learning (RL) agent of an artificial intelligence (AI) system, the RL agent comprising an action selector and a critic, the method comprising the steps of:

(a-1) initializing parameters of each actor neural network among a plurality of actor neural networks of the RL agent, wherein the plurality of actor neural networks forms an actor ensemble, and wherein the parameters of each actor neural network of the plurality of actor neural networks in the actor ensemble are initialized differently;

(a-2) at each actor neural network among the plurality of actor neural networks in the actor ensemble of the RL agent, receiving a current state, (s), of an environment for a current time step and outputting a continuous action, (a), for the current state based on a deterministic policy approximated by the respective actor neural network, thereby outputting a plurality of continuous actions;

(b) at a critic neural network of the critic of the RL agent, receiving the current state of the environment and the continuous action output by each respective actor neural network in the actor ensemble and outputting a state-action value for the current state and the respective continuous action based on a state-action value function approximated by the critic neural network, thereby outputting a plurality of state-action values, each state-action value, among the plurality of state-action values, associated with a respective continuous action among the plurality of continuous actions;

(c) selecting, at the action selector of the RL agent, a particular continuous action from among the plurality of continuous actions, wherein the selected continuous action is associated with a state-action value that is maximum among the plurality of state-action values;

(d) causing the AI system comprising the RL agent to carry out the selected continuous action in the environment;

(e) generating an experience tuple (s, a, r, s') comprising the current state of the environment(s), the selected continuous action (a), a reward provided by the environment (r), and a subsequent state of the environment (s');

(f) storing the experience tuple (s, a, r, s') in a replay buffer comprising a set of experience tuples;

(g) sampling the replay buffer to obtain a batch of tuples from the set of experience tuples;

(h) determining, by an actor parameter update determiner connected to receive the output of each actor neural network and the output of the critic neural network, a respective update for the parameters of each respective actor neural network of the plurality of actor neural networks in the actor ensemble based on the batch of tuples;

(i) providing, by the actor parameter update determiner, to each actor neural network among the plurality of actor neural networks in the actor ensemble, the respective update;

(j) training the plurality of actor neural networks in the actor ensemble by causing the respective update for the parameters of each respective actor neural network to be applied;

(k) determining, by a critic parameter update determiner connected to receive the output of the critic neural network, an update for the parameters of the critic neural network based on the batch of tuples, a determined state-action value, and a target state-action value (y);

(l) providing to the critic neural network, by the critic parameter update determiner, the update for the parameters of the critic neural network; and (m) training the critic neural network by causing the update for the parameters of the critic neural network to be applied.

2. The method of claim 1, further comprising repeating steps (a-2) to (m) for a predetermined number of time steps.

3. The method of claim 1, further comprising:

at the critic neural network, performing a look-ahead tree search and backup process to predict the state-action value for the state and the respective continuous action.

4. The method of claim 1, wherein the critic neural network represents a value prediction model.

5. The method of claim 1, wherein the critic neural network represents a transition model.

6. The method of claim 1, wherein the update for the parameters of the critic neural network is determined based on a loss value for the critic neural network based on a temporal-difference (TD) error of the critic neural network.

7. The method of claim 6, wherein the TD error of the critic neural network is represented as $$\frac{1}{2}(r_{t+1} + y\max_{i\in\{1,\dots,N\}}Q(s_{t+1}, \mu_i(s_{t+1})) - Q(s_t, a_t))^2$$

wherein $s_t$ is the current time step, $a_t$ is a selected continuous action at the current time step, $s_{t+1}$ is a subsequent time step, $Q(s_t,a_t)$ is a state-action value of a state-action value function for a state of the environment and the selected continuous action at the current time step, $\mu_i(s_{t+1})$ is a selected continuous action at the subsequent time step, $r_{t+1}$ is a reward for the selected continuous action at the subsequent time step, y is the target state-action value, $y\max_{i\in\{1,\dots,N\}}$ is a maximum of the target state-action value for the plurality of continuous actions, and N is a number of the plurality of continuous actions.

8. The method of claim 7, wherein the critic parameter update determiner trains the critic neural network to minimize the TD error, wherein the TD error is determined as a difference between the determined state-action value $$\left(f_q^d(z, a)\right)$$

and the target state-action value (y), and to ground a predicted reward (f̂) for a current latent state (z) for the current time step and a current action (a) for the current time step by subtracting a received reward (r) from the predicted reward (f̂), wherein the current latent state (z) is an n-dimensional latent state transformed from the current state(s) of the current time step via an encoding function ($f_{enc}$).

9. The method of claim 8, wherein the critic parameter update determiner determines a per time step update ($\Delta\theta^Q$) for the critic neural network parameters, $\theta^Q$, as represented by the following equation $$\theta^Q \leftarrow \theta^Q - \alpha\nabla_{\theta^Q}\left(\frac{1}{2}\left(f_q^d(z, a) - y\right)^2 + \frac{1}{2}(\hat{r} - r)^2\right),$$

wherein z' is a subsequent latent state for a state of the subsequent time step determined by the following equation $$y' \leftarrow \begin{cases} 0 & \text{if } s \text{ is terminal} \\ \max_i f_q^d\left(z', f_{\mu_i}(z')\right) & \text{otherwise} \end{cases},$$
$$y \leftarrow r + \gamma y',$$

y is a target state-action value for the subsequent latent state (z') and a best action is selected from the plurality of actor neural networks in the actor ensemble using the critic neural network by performing a look-ahead tree search, a is an action from the transition in the batch of tuples, r is an immediate reward received by the critic parameter update determiner from the replay buffer, and y' is a maximum state-action value of the subsequent latent state (z').

10. The method of claim 9, wherein the update for the parameters of the critic neural network is determined using gradient descent, the critic neural network of the critic being trained by taking one gradient descent algorithm step at each time, t, to minimize the TD error, wherein the critic parameter update determiner determines a gradient for the critic neural network parameters, $\theta^Q$, through use of the following equation $$\nabla_{\theta^Q}\left(\frac{1}{2}\left(f_q^d(z, a) - y\right)^2 + \frac{1}{2}(\hat{r} - r)^2\right).$$

11. The method of claim 10, wherein the respective update for the parameters of each respective actor neural network of the plurality of actor neural networks in the actor ensemble is determined using a gradient ascent algorithm, the plurality of actor neural networks being trained, in parallel, to optimize the actor ensemble parameters, $\theta^\mu$, via the gradient ascent algorithm, to maximize each state-action value associated with the action output from each actor neural network to find a global maximum.

12. The method of claim 11, wherein the actor parameter update determiner may determine a per time step update ($\Delta\theta^\mu$) to the actor ensemble parameters, $\theta^\mu$, as represented by the following equation:

$$\theta^\mu \leftarrow \theta^\mu + \beta\nabla_{\theta^\mu}\sum_{i=1}^{N}\nabla_b f_q^d(z, b)\,|_{b=f_{\mu_i}(z)}\,\nabla_{\theta^\mu}\,f_{\mu_i}(z)$$

wherein $$\nabla_b f_q^d(z, b)\,|_{b=f_{\mu_i}(z)}\,\nabla_{\theta^\mu}\,f_{\mu_i}(z)$$

is used by the actor parameter update determiner to determine a gradient for the actor ensemble parameters $\theta^\mu$, $$\nabla_b f_q^d(z, b)\,|_{b=f_{\mu_i}(z)}$$

is a respective gradient for a state-action value function $$f_q^d(z, b)\,|_{b=f_{\mu_i}(z)}$$

for a corresponding actor neural network at the current latent state (z), and $\nabla_{\theta^\mu}\theta_{\mu_i}(z)$ is a respective gradient function for the action function ($f_{\mu_i}(z)$) for corresponding actor neural network at the current latent state (z).

13. The method of claim 1, wherein the AI system is coupled to a control system of a vehicle, robot or machine interacting with the environment to accomplish a particular task, wherein each continuous action in the plurality of continuous actions corresponds to a set of control inputs to control the vehicle, robot or machine to accomplish a particular task, and wherein step (c) and (d) comprise:

(c) selecting, at the action selector of the RL agent, a particular set of control inputs from among a plurality of set of control inputs corresponding to the plurality of continuous action, wherein the selected set of control inputs is associated with a state-action value that is maximum among the plurality of state-action values; and (d) causing the control system of the vehicle, robot or machine to execute the control inputs to control the vehicle, robot or machine interacting with the environment to accomplish the particular task.

14. The method of claim 1, wherein the environment is a simulation environment generated by a computing system and the AI system is coupled to the computing system, wherein each continuous action in the plurality of continuous actions corresponds to a set of control inputs to control a simulated user, vehicle, robot or machine in the simulation environment to accomplish a particular task, and wherein step (c) and (d) comprise:

(c) selecting, at the action selector of the RL agent, a particular set of control inputs from among a plurality of set of control inputs corresponding to the plurality of continuous action, wherein the selected set of control inputs is associated with a state-action value that is maximum among the plurality of state-action values; and (d) causing the computing system to execute the control inputs to control the simulated user, vehicle, robot or machine in the simulation environment to accomplish the particular task.

15. A processing unit comprising:

a non-transitory computer-readable medium having tangibly stored thereon executable instructions;

a processor configured, by the executable instructions, to use train a reinforcement learning (RL) agent of an artificial intelligence (AI) system, the RL agent comprising an action selector and a critic, wherein the executable instructions, in response to execution by the processor, cause the processor to train the (RL) agent by:

(a-1) initializing parameters of each actor neural network among a plurality of actor neural networks of the RL agent, wherein the plurality of actor neural networks forms an actor ensemble, and wherein the parameters of each actor neural network of the plurality of actor neural networks in the actor ensemble are initialized differently;

(a-2) at each actor neural network among the plurality of actor neural networks in the actor ensemble of the RL agent, receiving a current state, (s), of an environment for a current time step and outputting a continuous action, (a), for the current state based on a deterministic policy approximated by the respective actor neural network, thereby outputting a plurality of continuous actions;

(b) at a critic neural network of the critic of the RL agent, receiving the current state of the environment and the continuous action output by each respective actor neural network in the actor ensemble and outputting a state-action value for the current state and the respective continuous action based on a state-action value function approximated by the critic neural network, thereby outputting a plurality of state-action values, each state-action value, among the plurality of state-action values, associated with a respective continuous action among the plurality of continuous actions;

(c) selecting, at the action selector of the RL agent, a particular continuous action from among the plurality of continuous actions, wherein the selected continuous action is associated with a state-action value that is maximum among the plurality of state-action values;

(d) causing the AI system comprising the RL agent to carry out the selected continuous action in the environment;

(e) generating an experience tuple (s, a, r, s') comprising the current state of the environment(s), the selected continuous action (a), a reward provided by the environment (r), and a subsequent state of the environment (s');

(f) storing the experience tuple (s, a, r, s') in a replay buffer comprising a set of experience tuples;

(g) sampling the replay buffer to obtain a batch of tuples from the set of experience tuples;

(h) determining, by an actor parameter update determiner connected to receive the output of each actor neural network and the output of the critic neural network, a respective update for the parameters of each respective actor neural network of the plurality of actor neural networks in the actor ensemble based on the batch of tuples;

(i) providing, by the actor parameter update determiner, to each actor neural network among the plurality of actor neural networks in the actor ensemble, the respective update;

(j) training the plurality of actor neural networks in the actor ensemble by causing the respective update for the parameters of each respective actor neural network to be applied;

(k) determining, by a critic parameter update determiner connected to receive the output of the critic neural network, an update for the parameters of the critic neural network based on the batch of tuples, a determined state-action value, and a target state-action value (y);

(l) providing to the critic neural network, by the critic parameter update determiner, the update for the parameters of the critic neural network; and (m) training the critic neural network by causing the update for the parameters of the critic neural network to be applied.

16. The processing unit of claim 15, wherein the processor is further configured, by execution of the executable instructions, to train the RL agent by repeating steps (a-2) to (m) for a predetermined number of time steps.

17. The processing unit of claim 15, wherein the processor is further configured, by execution of the executable instructions, to train the RL agent by, at the critic neural network, performing a look-ahead tree search and backup process to predict the state-action value for the state and the respective continuous action.

18. The processing unit of claim 15, wherein the critic neural network represents a value prediction model.

19. The processing unit of claim 15, wherein the critic neural network represents a transition model.

20. A non-transitory computer-readable medium comprising executable instructions that, in response to execution by a processor, cause the processor to train use a reinforcement learning (RL) agent of an artificial intelligence (AI) system, the RL agent comprising an action selector and a critic, by:

(a-1) initializing parameters of each actor neural network among a plurality of actor neural networks of the RL agent, wherein the plurality of actor neural networks forms an actor ensemble, and wherein the parameters of each actor neural network of the plurality of actor neural networks in the actor ensemble are initialized differently;

(a-2) at each actor neural network among the plurality of actor neural networks in the actor ensemble of the RL agent, receiving a current state, (s), of an environment for a current time step and outputting a continuous action, (a), for the current state based on a deterministic policy approximated by the respective actor neural network, thereby outputting a plurality of continuous actions;

(b) at a critic neural network of the critic of the RL agent, receiving the current state of the environment and the continuous action output by each respective actor neural network in the actor ensemble and outputting a state-action value for the current state and the respective continuous action based on a state-action value function approximated by the critic neural network, thereby outputting a plurality of state-action values, each state-action value, among the plurality of state-action values, associated with a respective continuous action among the plurality of continuous actions;

(c) selecting, at the action selector of the RL agent, a particular continuous action from among the plurality of continuous actions, wherein the selected continuous action is associated with a state-action value that is maximum among the plurality of state-action values;

(d) causing the AI system comprising the RL agent to carry out the selected continuous action in the environment;

(e) generating an experience tuple (s, a, r, s') comprising the current state of the environment(s), the selected continuous action (a), a reward provided by the environment (r), and a subsequent state of the environment (s');

(f) storing the experience tuple (s, a, r, s') in a replay buffer comprising a set of experience tuples;

(g) sampling the replay buffer to obtain a batch of tuples from the set of experience tuples;

(h) determining, by an actor parameter update determiner connected to receive the output of each actor neural network and the output of the critic neural network, a respective update for the parameters of each respective actor neural network of the plurality of actor neural networks in the actor ensemble based on the batch of tuples;

(i) providing, by the actor parameter update determiner, to each actor neural network among the plurality of actor neural networks in the actor ensemble, the respective update;

(j) training the plurality of actor neural networks in the actor ensemble by causing the respective update for the parameters of each respective actor neural network to be applied;

(k) determining, by a critic parameter update determiner connected to receive the output of the critic neural network, an update for the parameters of the critic neural network based on the batch of tuples, a determined state-action value, and a target state-action value (y);

(l) providing to the critic neural network, by the critic parameter update determiner, the update for the parameters of the critic neural network; and (m) training the critic neural network by causing the update for the parameters of the critic neural network to be applied.

21. The non-transitory computer-readable medium of claim 20, wherein the instructions, to train the RL agent by, at the critic neural network, performing a look-ahead tree search and backup process to predict the state-action value for the state and the respective continuous action.

* * * * *